United States Patent
Loveland et al.

(10) Patent No.: US 10,984,182 B2
(45) Date of Patent: Apr. 20, 2021

(54) SYSTEMS AND METHODS FOR CONTEXT-RICH ANNOTATION AND REPORT GENERATION FOR UAV MICROSCAN DATA

(71) Applicant: Loveland Innovations, LLC, Alpine, UT (US)

(72) Inventors: Jim Loveland, Alpine, UT (US); Leif Larson, Alpine, UT (US); Dan Christiansen, Alpine, UT (US); Tad Christiansen, Alpine, UT (US); Cam Christiansen, Alpine, UT (US)

(73) Assignee: Loveland Innovations, LLC, Pleasant Grove, UT (US)

( * ) Notice: Subject to any disclaimer, the term of this patent is extended or adjusted under 35 U.S.C. 154(b) by 36 days.

(21) Appl. No.: 15/712,396

(22) Filed: Sep. 22, 2017

(65) Prior Publication Data
US 2018/0330528 A1  Nov. 15, 2018

Related U.S. Application Data

(60) Provisional application No. 62/505,684, filed on May 12, 2017.

(51) Int. Cl.
| | | |
|---|---|---|
| *G06F 40/169* | (2020.01) | |
| *G06F 3/0484* | (2013.01) | |
| *B64C 39/02* | (2006.01) | |
| *G01C 21/20* | (2006.01) | |

(Continued)

(52) U.S. Cl.
CPC .......... *G06F 40/169* (2020.01); *B64C 39/024* (2013.01); *G01C 11/02* (2013.01);
(Continued)

(58) Field of Classification Search
CPC .... H04N 19/17; H04N 19/174; H04N 19/176; G06T 2207/20104
See application file for complete search history.

(56) References Cited

U.S. PATENT DOCUMENTS

| | | |
|---|---|---|
| 5,721,691 A | 2/1998 | Wuller |
| 5,816,819 A | 10/1998 | Rockburn |

(Continued)

FOREIGN PATENT DOCUMENTS

| | | |
|---|---|---|
| WO | 2016/053438 | 4/2016 |
| WO | 2018/089268 | 5/2018 |
| WO | WO 2018/209294 | 11/2018 |

OTHER PUBLICATIONS

U.S. Appl. No. 15/796,672, Non-Final Office Action dated Dec. 14, 2017.

(Continued)

*Primary Examiner* — Ariel Mercado
(74) *Attorney, Agent, or Firm* — Phillips Winchester; Justin K. Flanagan

(57) ABSTRACT

Systems and methods are disclosed herein relating to the annotation of microscan data/images and the generation of context-rich electronic reports. Microscan images are imported and displayed in a context-rich environment to provide contextual information for an operator to annotate microscan images. Markers are used to identify the relative location of a microscan image on a full-subject image. Reports are generated that include a full-subject image with one or more markers identifying the relative locations of annotated image data in one or more locations on the full-subject image. Hyperlinked data elements allow for quick navigation to detailed report information in location selection sections of the report for each marked location on the full-subject image in the report.

7 Claims, 15 Drawing Sheets

(51) Int. Cl.
*G06F 3/0482* (2013.01)
*G01C 11/02* (2006.01)
*G06T 11/60* (2006.01)
*G06F 40/134* (2020.01)

(52) U.S. Cl.
CPC ......... *G01C 21/206* (2013.01); *G06F 3/0482* (2013.01); *G06F 3/0484* (2013.01); *G06F 40/134* (2020.01); *G06T 11/60* (2013.01); *B64C 2201/123* (2013.01)

(56) References Cited

U.S. PATENT DOCUMENTS

| | | | |
|---|---|---|---|
| 6,037,945 A * | 3/2000 | Loveland | G06Q 10/06 345/420 |
| 6,333,749 B1 | 12/2001 | Reinhardt | |
| 6,810,383 B1 | 10/2004 | Loveland | |
| 6,826,539 B2 | 11/2004 | Loveland | |
| 6,829,584 B2 | 12/2004 | Loveland | |
| 7,363,157 B1 | 4/2008 | Hanna | |
| 7,447,564 B2 | 11/2008 | Yasukawa | |
| 7,868,812 B2 | 1/2011 | Huthoefer | |
| 8,078,436 B2 * | 12/2011 | Pershing | G06Q 10/06313 703/2 |
| 8,159,662 B2 | 4/2012 | Rezac | |
| 8,170,840 B2 | 5/2012 | Pershing | |
| 8,209,152 B2 | 6/2012 | Pershing | |
| 8,229,768 B1 | 7/2012 | Hopkins | |
| 8,345,578 B2 | 1/2013 | Thoumy | |
| 8,346,578 B1 | 1/2013 | Hopkins | |
| 8,380,349 B1 | 2/2013 | Hickman | |
| 8,473,125 B2 | 6/2013 | Rischmuller | |
| 8,542,880 B2 | 9/2013 | Thornberry | |
| 8,718,838 B2 | 5/2014 | Kokkeby | |
| 8,818,572 B1 | 8/2014 | Tofte | |
| 8,818,770 B2 | 8/2014 | Pershing | |
| 8,823,732 B2 | 9/2014 | Adams | |
| 8,825,454 B2 * | 9/2014 | Pershing | G06F 30/13 703/1 |
| 9,036,861 B2 | 5/2015 | Chen | |
| 9,075,415 B2 | 7/2015 | Kugelmass | |
| 9,098,655 B2 | 8/2015 | Plummer | |
| 9,116,003 B2 | 8/2015 | Khorashadi | |
| 9,129,376 B2 | 9/2015 | Pershing | |
| 9,135,737 B2 | 9/2015 | Pershing | |
| 9,152,863 B1 | 10/2015 | Grant | |
| 9,162,753 B1 | 10/2015 | Panto | |
| 9,201,422 B2 | 12/2015 | Ohtomo | |
| 9,251,417 B1 | 2/2016 | Xu | |
| 9,501,061 B2 | 11/2016 | Canoy | |
| 9,501,700 B2 | 11/2016 | Loveland | |
| 9,505,494 B1 | 11/2016 | Marlow | |
| 9,513,635 B1 | 12/2016 | Bethke | |
| 9,563,201 B1 | 2/2017 | Tofte | |
| 9,609,288 B1 | 3/2017 | Richman | |
| 9,613,538 B1 | 4/2017 | Poole | |
| 9,618,940 B1 | 4/2017 | Michini | |
| 9,639,960 B1 | 5/2017 | Loveland | |
| 9,734,397 B1 | 8/2017 | Larson | |
| 9,805,261 B1 | 10/2017 | Loveland | |
| 9,805,489 B2 | 10/2017 | Schultz | |
| 9,823,658 B1 | 11/2017 | Loveland | |
| 9,836,882 B2 | 12/2017 | Freund | |
| 9,881,163 B2 | 1/2018 | Schultz | |
| 10,032,078 B1 | 1/2018 | Schultz | |
| 9,898,802 B2 | 2/2018 | Giuffrida | |
| 9,933,254 B2 | 4/2018 | Thornberry | |
| 9,953,112 B2 | 4/2018 | Schultz | |
| 9,959,609 B2 | 5/2018 | Giuffrida | |
| 9,959,653 B2 | 5/2018 | Schultz | |
| 9,959,667 B2 | 5/2018 | Schultz | |
| 9,972,126 B2 | 5/2018 | Freund | |
| 9,978,149 B1 | 5/2018 | Zhang | |
| 10,037,463 B2 | 7/2018 | Schultz | |
| 10,037,464 B2 | 7/2018 | Schultz | |
| 10,663,294 B2 * | 5/2020 | Pershing | G06F 30/13 |
| 2002/0013644 A1 | 1/2002 | Mekemson | |
| 2002/0169664 A1 | 11/2002 | Walker | |
| 2003/0033242 A1 | 2/2003 | Lynch | |
| 2003/0210168 A1 | 11/2003 | Ruszkowski, Jr. | |
| 2004/0066917 A1 | 4/2004 | Yasukawa | |
| 2004/0167667 A1 | 8/2004 | Goncalves | |
| 2004/0167861 A1 | 8/2004 | Hedley | |
| 2004/0177373 A1 | 9/2004 | Kawabe | |
| 2005/0267657 A1 | 12/2005 | Devdhar | |
| 2006/0133661 A1 | 6/2006 | Takeda | |
| 2006/0137736 A1 | 6/2006 | Nishitani | |
| 2007/0110338 A1 * | 5/2007 | Snavely | G06F 3/04842 382/305 |
| 2007/0233367 A1 | 10/2007 | Chen | |
| 2008/0285886 A1 * | 11/2008 | Allen | G06T 17/05 382/284 |
| 2009/0201190 A1 | 8/2009 | Huthoefer | |
| 2009/0265193 A1 | 10/2009 | Collins | |
| 2010/0215212 A1 | 8/2010 | Flakes | |
| 2010/0277588 A1 | 11/2010 | Ellsworth | |
| 2010/0277723 A1 | 11/2010 | Rezac | |
| 2012/0237083 A1 | 9/2012 | Lange | |
| 2013/0182108 A1 | 7/2013 | Meadow | |
| 2013/0216089 A1 | 8/2013 | Chen | |
| 2013/0262029 A1 * | 10/2013 | Pershing | G06Q 10/06 702/156 |
| 2013/0325244 A1 | 12/2013 | Wang | |
| 2014/0153773 A1 | 6/2014 | Gupta | |
| 2014/0168420 A1 | 6/2014 | Naderhirn | |
| 2014/0316614 A1 | 10/2014 | Newman | |
| 2014/0316616 A1 | 10/2014 | Kugelmass | |
| 2014/0324405 A1 | 10/2014 | Plummer | |
| 2014/0336928 A1 | 11/2014 | Scott | |
| 2015/0019267 A1 | 1/2015 | Prieto | |
| 2015/0039466 A1 * | 2/2015 | Skinner | G06Q 30/0609 705/26.35 |
| 2015/0051921 A1 * | 2/2015 | Tran | G16H 30/00 705/3 |
| 2015/0148955 A1 | 5/2015 | Chin | |
| 2015/0213315 A1 * | 7/2015 | Gross | G06T 1/0007 382/159 |
| 2015/0220085 A1 | 8/2015 | Ohtomo | |
| 2015/0225081 A1 | 8/2015 | Kespry | |
| 2015/0348204 A1 | 12/2015 | Daues | |
| 2015/0371346 A1 | 12/2015 | Frendling | |
| 2015/0377405 A1 | 12/2015 | Down | |
| 2016/0004795 A1 | 1/2016 | Novak | |
| 2016/0046374 A1 | 2/2016 | Kugelmass | |
| 2016/0148363 A1 | 5/2016 | Phan | |
| 2016/0246304 A1 | 8/2016 | Canoy | |
| 2016/0247115 A1 | 8/2016 | Pons | |
| 2016/0253808 A1 | 9/2016 | Metzler | |
| 2016/0257424 A1 | 9/2016 | Kespry | |
| 2016/0272308 A1 | 9/2016 | Gentry | |
| 2016/0292872 A1 | 10/2016 | Hammond | |
| 2016/0301859 A1 | 10/2016 | Tebay | |
| 2016/0307447 A1 | 10/2016 | Johnson | |
| 2016/0313736 A1 | 10/2016 | Schultz | |
| 2016/0321503 A1 | 11/2016 | Zhou | |
| 2016/0327959 A1 | 11/2016 | Brown | |
| 2016/0347462 A1 | 12/2016 | Kespry | |
| 2016/0363929 A1 | 12/2016 | Kespry | |
| 2016/0365825 A1 | 12/2016 | Poivet | |
| 2016/0377424 A1 | 12/2016 | Clark | |
| 2017/0053169 A1 | 2/2017 | Cuban | |
| 2017/0090481 A1 | 3/2017 | Kespry | |
| 2017/0123035 A1 | 5/2017 | Kespry | |
| 2017/0146344 A1 | 5/2017 | Kespry | |
| 2017/0193829 A1 | 7/2017 | Bauer | |
| 2017/0249510 A1 | 8/2017 | Labrie | |
| 2017/0270612 A1 | 9/2017 | Howe | |
| 2017/0270650 A1 | 9/2017 | Howe | |

OTHER PUBLICATIONS

U.S. Appl. No. 15/708,471, Non-Final Office Action dated Jan. 5, 2018.

(56) References Cited

OTHER PUBLICATIONS

USPTO Notice of Allowance; U.S. Appl. No. 15/388,754; dated Oct. 5, 2017.
Autonomous MAV—Cues, Cooper Bills et al., IEEE, 978-1-61284-385-8, 2011, pp. 5776-5783.
Unmanned—Monitoring, C. Eschmann et al., ResearchGate, 2012, pp. 1-8.
USPTO Final Office Action; U.S. Appl. No. 15/446,202; dated Nov. 8, 2017.
USPTO Notice of Allowance; U.S. Appl. No. 15/360,630; dated Jun. 21, 2017.
USPTO Notice of Allowance; U.S. Appl. No. 15/444,164; dated Sep. 22, 2017.
USPTO Non-final Office Action; U.S. Appl. No. 15/388,754; dated May 26, 2017.
USPTO Non-final Office Action; U.S. Appl. No. 15/480,310; dated May 15, 2017.
USPTO Non-final Office Action; U.S. Appl. No. 15/444,164; dated Apr. 21, 2017, 21 pp.
USPTO Non-final Office Action; U.S. Appl. No. 15/360,630; dated Apr. 13, 2017, 13 pp.
PCT Application No. PCT/US2017/059990, Written Opinion dated Jan. 29, 2018, 4 pp.
USPTO Final Office Action; U.S. Appl. No. 15/444,164; dated Jul. 14, 2017, 9 pp.
U.S. Appl. No. 15/446,202, Non-Final Office Action dated Feb. 22, 2018, 9 pp.
USPTO Notice of Allowance; U.S. Appl. No. 15/360,641; dated Mar. 17, 2017, 16 pp.
PCT Application No. PCT/US2017/059990, International Search Report dated Jan. 29, 2018, 2 pp.
USPTO Non-final Office Action; U.S. Appl. No. 15/446,202; dated Jun. 28, 2017, 22 pp.
U.S. Appl. No. 15/446,202, Notice of Allowance dated Jul. 5, 2018, 11 pp.
U.S. Appl. No. 15/796,672, Final Office Action dated Jun. 25, 2018, 16 pp.

* cited by examiner

SYSTEMS AND METHODS FOR CONTEXT-RICH ANNOTATION AND REPORT GENERATION FOR UAV MICROSCAN DATA

PRIORITY APPLICATIONS

This disclosure claims priority to U.S. Provisional Patent Application No. 62/505,684 filed on May 12, 2017 titled "Systems and Methods for Context-Rich Annotation and Report Generation for UAV Microscan Data," which application is hereby incorporated by reference in its entirety.

TECHNICAL FIELD

This disclosure generally relates to systems and methods for annotating microscan data and generating reports in a context-rich format.

BRIEF DESCRIPTION OF THE DRAWINGS

Non-limiting and non-exhaustive embodiments of the disclosure are described herein, including various embodiments of the disclosure with reference to the figures listed below. For this provisional application, some of the figures described below are associated with a screenshot of a display of a working system in the appendix drawings immediately following drawing sheet 15/15.

DETAILED DESCRIPTION

Figure 1:
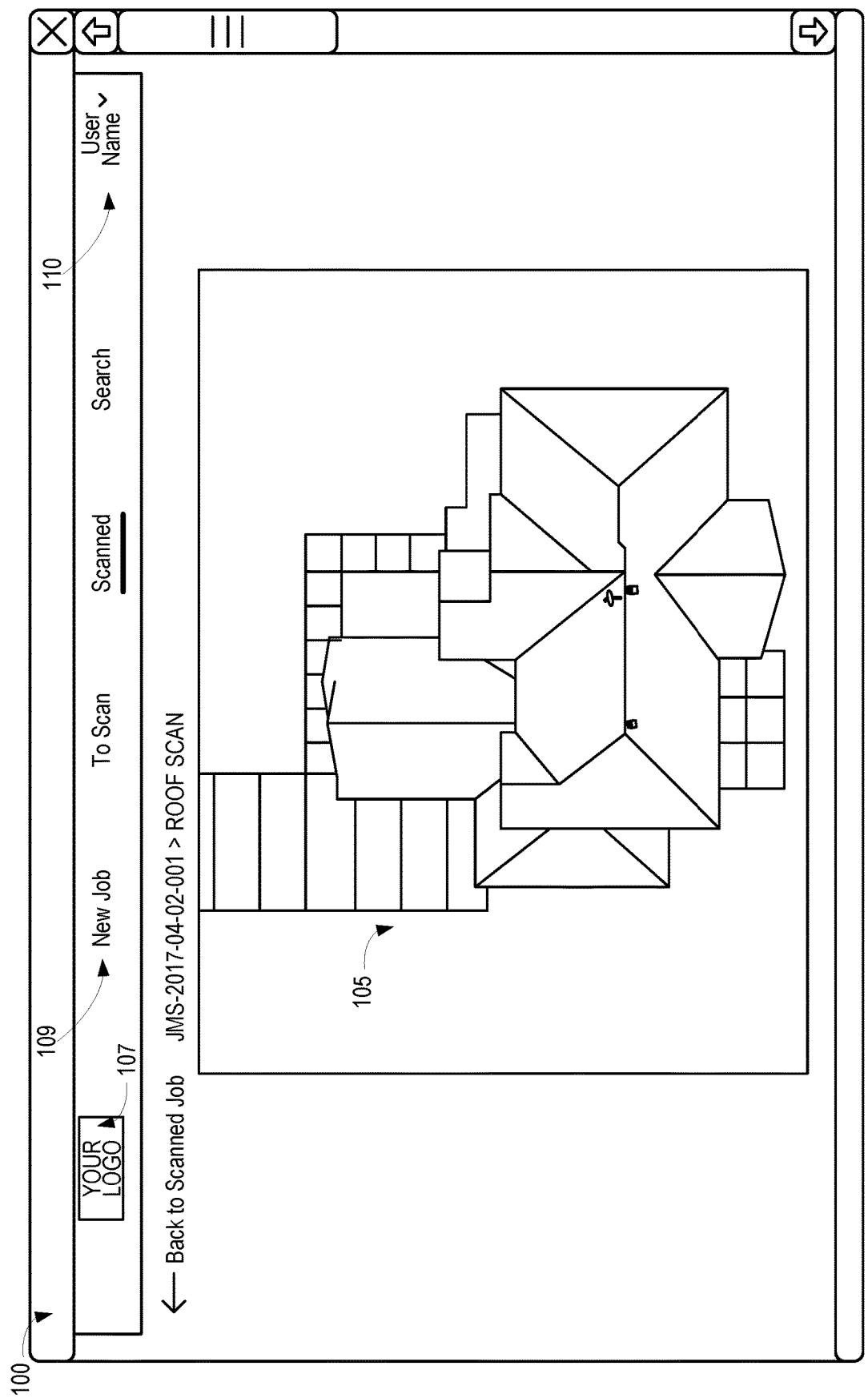
FIG. 1 illustrates a full-subject image of a property imported into an annotation and reporting system, according to various embodiments.

This disclosure provides methods and systems for assessing structures and/or other personal property using an unmanned aerial vehicle (UAV) or other autonomous vehicle, such as a terrestrial vehicle. This disclosure also provides systems and methods for post image and data collection processing, visualization, annotation, and reporting. The description below provides some examples of how images (including optical, infrared, moisture, ultraviolet, ultrasonic, and false-color representations of the same) and other data may be collected as full-subject views, oblique images, perpendicular images, and microscan surface and subsurface views. Following the capture of images and other data, process, visualization, annotation and reporting can be very difficult. For example, very close-up views may lack context and non-optical images and even false-color images may be difficult for a human to contextually place.

As a specific example, multiple microscan images of the shingles of a roof may all look virtually the same to an operator. If hundreds or even thousands of images are taken of a subject (e.g., a house, commercial building, industrial building, or other property), an operator may have a difficult time visualizing and contextually understanding the microscan images. This disclosure described systems and methods for visualizing and annotating microscan images in a context-rich environment and the automatic or semi-automatic generation of a context-rich report of the annotated images using modified or newly created images based on the original microscan images and annotations provided by an operator. Additionally, various systems and methods for capturing images, including microscan images, are described below. Additional examples of microscan image collection and other data collection can be found in U.S. patent application Ser. Nos. 15/444,164, 15/466,202, 15/388,754, and 15/360,641, by the same inventors, each of which is hereby incorporated by reference in its entirety, including the drawings and claims thereof.

Microscan images, full-subject images, oblique images, and other images and image data such as false-color representations of data, graphs, numerical values, and the like (broadly "images" or synonymously "scan data") may be collected using (1) any of the systems and methods described below, (2) any of the systems and methods described in the applications incorporated herein by reference above, and/or (3) using any other systems and methods to obtain microscan data.

Once microscan images are collected, they may be imported into a management system for visualization, review, annotation, and/or reporting. In some embodiments, the system may be embodied as any combination of hardware, firmware, and software. For example, a non-transitory computer-readable medium may be used to store instructions that, when executed by a processor, cause the processor to perform operations. The operations may be used for visualization of microscan data, annotation of microscan data, and report generation. Each of these functions may be provided in a highly context-rich environment. The system may generate reports using modified or newly created images based on operator annotations. The reports may include hyperlinks to specific sections in visually context-rich format to allow for easy navigation of highly detailed microscan data.

The operations may include importing a plurality of microscan images of a structure into an electronic annotation and reporting system. Each of the plurality of microscan images may be associated with a particular location on the structure or relative to the structure (or other property). For example, the images may be geotagged with GPS data and/or the system may conduct image analysis to determine a relative location of the image with respect to the structure and/or other microscan images.

The system may automatically identify or receive from the operator a full-subject image (e.g., optical, infrared, ultraviolet, etc., including false-color representations of the same). In some embodiments, the full-subject image may be created by the system using a combination of microscan images. The full-subject image may be a two-dimensional image or a three-dimensional model of the subject (e.g., a structure).

The system may display the full-subject image to the operator. The operator may provide a selection of a first location on the full subject image for more detailed inspection. For instance, the operator may visually identify elements that are likely to warrant inspection such as discolored portions, areas with high moisture detected, vents, mounted items on a roof, corners, peaks, edges, depressions, protrusions, etc.

In response to the user selecting a location, a marker may be displayed on the full subject image to identify the first location selection. Microscan images associated with the first location selection may be displayed in a separate panel, window, or screen concurrently with the marker on the full subject image. The concurrent display of these elements provides visual context to the operator to assist the operator in understanding the microscan images.

An operator may scroll, flip, rotate, or otherwise browse through the microscan images associated with the first location selection receiving a user selection of a first of the various microscan images associated with the first location selection. The operator may then provide annotations in the form of markings, highlighting, comments, defect or problem identifications, etc. with respect to the selected microscan image. In some embodiments, the unselected microscan images associated with the first location selection may be visible in a gallery view (e.g., tiles, scrolling thumbnails, via a link, accessible via forward/backward/up/down arrows, or the like).

The operator may then select a second of the various microscan images and provide annotation relative to that microscan image that relate to the same or a different problems, issue, or characteristic.

Returning to the full-subject view, the operator may select a second location on the full-subject view to inspect the detailed microscan images associated with that region. Again, the associated microscan images may be available for contextual inspection, annotation, and visualization.

Ultimately, a context-rich visualization of the full-subject image may be created that includes one or more markers identifying locations at which microscan images have been tagged or otherwise annotated. The operator may select a marker and the system may then display a context-rich visualization of the annotated microscan images associated with the selected location on the full-subject image.

The operator may generate a report that includes a description of the structure, purpose of the report, identifying information, personal information and the like. The report may be printed or in electronic form. In an electronic form, the report may include multiple sections, including a full-subject section and sections for each of the selected and annotated selections of the full-subject image. Thus, the report may include a full-subject image with various markers identifying locations at which microscan images have been annotated. The multi-section electronic report may allow the user to select descriptive hyperlinks of the annotated location selections, and/or hyperlinks associated with the markers themselves on the full-subject image that route the operator to the corresponding location selection section.

Thus, in an example in which a chimney and a discolored shingle section of a roof have each been inspected by an operator, microscan images associated with each location may be annotated with identified problems, issues, or characteristics. The system may generate a contextually-rich electronic report that includes a full-subject image of the structure with markers proximate the chimney and the discolored shingle section of the roof. Each marker and/or a written description of each marker proximate the full-subject image in the report may provide hyperlink to a corresponding section of the report that includes the corresponding annotated microscan images.

Each location selection section (e.g., a first location selection section for the chimney and a second location selection section for the discolored shingles) may include the annotated microscan images along with one or more images to provide a contextual location and/or viewing angle of the annotated microscan image(s) for the location selection section.

The non-transitory computer-readable medium, systems, and methods are described as relating to the processing, visualization, annotation of, and reporting of images. The term "images" is used broadly and encompasses a wide variety of data collected by any of a wide variety of sensors and may be visually displayed as an "image" to an operator as a false color image, a numerical value, a graph, a gradient, or the like. For example, some of the images of the microscan images may be visible spectrum images, others may be infrared images presented in false color, others may be infrared images presented as numerical values overlaid on a wireframe depiction of a portion of the structure, and still other images may be a single numerical value specifying a moisture reading or a slope of the structure.

As previously noted, the systems and methods described herein may be used to process, visualize, annotate, and report on a wide variety of microscan images, full-subject images, oblique images, and other images and image data. The paragraphs below preceding the description of FIG. 1 provide some examples of how such images may be captured in a systematic manner. Additional support for these systems and methods can be found in the applications to which this application claims priority, including U.S. Provisional Application No. 62/417,779, and the applications incorporated by reference above.

In various embodiments, a UAV may carry an imaging system to capture a sequence of images of a target object, such as a structure. The UAV may initially position itself above the location of interest to allow the imaging system to capture a nadir or full-subject image of an area of interest that includes a target structure. The UAV may subsequently follow a boustrophedonic flight path while the imaging system captures a series of closer images and/or collects non-image scan information. The UAV may subsequently position itself around the structure to collect oblique images at one or more heights on each critical side of the structure and/or the vertex of the structure. To collect partial or full structural information, the UAV may perform a loop scan while the imaging system captures a set of oblique images. For additional detailed images of the area of interest, the UAV and imaging system may perform a series of micro scans. Using the collection of images, a rendering system may generate interactive models of the target structure or other object.

In various embodiments, UAV hardware, firmware, and/or software may be modified, upgraded, and/or programmed to perform the functions, methods, and behaviors described herein. In some embodiments, software, hardware, and/or firmware may be created to interface with pre-existing UAV interfaces. In other embodiments, modifications to one or more portions of a UAV may be made to accomplish the described systems and methods.

A UAV may carry an imaging system to capture multiple images of the roof. The UAV may capture visible light images, infrared images, and/or ultraviolet images. Other sensor types may be used as well, including, but not limited to moisture sensors, ultrasonic sensors, LIDAR, RADAR, etc. False color representations may be generated for visualizing sensor data from non-visible spectrum image sensors.

The systems and methods described herein may be implemented by an owner of the roof or an agent of a company (including a representative, contractor, or employee thereof). Examples of companies that might utilize the systems and methods described herein include, but are not limited to, an insurance company, a roofing company, a damage assessment company, an inspector, a government analyst, an appraiser, or other property valuation, evaluation, assessment, or repair company.

In various embodiments, an agent may function as an operator of the UAV and utilize a remote control system, such as a personal computer or personal electronic device. Examples of such devices include watches, tablets, and mobile phones. An operator may use the computing device to initiate a roof assessment via a software program. In some embodiments, the agent may use the software program to select a standard assessment model, a desired sample size (e.g., patch regions dimensions for a patch scan analysis), and/or a desired scope of the assessment. In some embodiments, the agent may begin the UAV assessment by placing the UAV in a safe location for takeoff and selecting a "start" or "begin" icon on the computing device.

The UAV may be programmed to perform an analysis of the nearest roof or one or more roofs based on a selection by the operator. For instance, the operator may use satellite images or real-time nadir images from the UAV to select one or more structures having one or more roofs for the UAV to analyze.

In some embodiments, the UAV may initially position itself above the selected roof(s) to capture nadir images of the roof(s) and/or associated structures. The UAV may subsequently follow a boustrophedonic flight path while the imaging system captures a series of images and/or collects non-visible image scan information. The UAV may subsequently position itself at various altitudes and angles relative to the roof to collect oblique images at one or more heights and/or relative to each face of the roof. To facilitate subsequent rendering of a three-dimensional model, the UAV may perform a loop scan of the roof while the imaging system captures a set of oblique images. For additional detailed images of the roof, the UAV and imaging system may perform a series of micro scans, sometimes referred to as detailed micro scans or microscans. A microscan may consist of or include a patch scan analysis of a patch region with defined dimensions Using the collection of images, a rendering system may generate interactive models of the roof and/or optionally the underlying structure. In some embodiments, the UAV may descent in a plurality of columns relative to the structure to capture microscan images as detailed in the patent application cited above and incorporated herein by reference.

As described above, modifications to one or more portions of a UAV may be made to accomplish the described systems and methods. Hardware, firmware, and/or software may also be used in conjunction with a UAV to extend or replace its capabilities to implement any of the embodiments described herein. In some embodiments, multiple UAVs may be utilized that together provide the desired feature set for a particular application. For example, one UAV may be used for infrared scanning and a different UAV may be used for visible image captures. In some embodiments, the same UAV may be used, and the operator may swap sensor systems during various portions of the scan (e.g., halfway through a scan, an operator may remove a visible spectrum camera and replace it with an infrared camera).

While many of the examples described herein relate to damage assessments and roof replacement repair estimates, similar technology and approaches could be used with minor adaptations for use by rooftop installers, such as satellite dish installers, solar panel installers, swamp cooler installers, antenna installers, and the like.

In some embodiments of the present disclosure, a technician may manually operate a UAV to navigate it around the structure while the UAV autonomously captures the needed data for a desired assessment. In many embodiments, the use of a UAV facilitates and/or augments the services provided by a human, it does not necessarily replace the human role. For example, usage of the systems and methods described herein allow an insurance company or roofing company to send an agent skilled in customer relations and/or sales, regardless of whether that person has training in roof damage analysis or roofing estimates.

A UAV roof analysis system, according to various embodiments described herein, provides a comprehensive, automatic (or at least semi-automatic), and methodical approach for assessing damage on a roof and/or for providing an estimate for remediation of the roof. The types of assessments, reports, and images collected may vary based on a specific application. Generally, the approaches obviate the need for an industry specific trained technician to be present, or at least greatly reduce the workload of such a technician.

The UAV roof analysis system may include a site selection interface to receive an electronic input identifying a location of a roof or roofs. The UAV roof analysis system may also include a hazard selection interface to receive electronic input identifying geographic hazards such as aboveground power lines, tall trees, neighboring structures, etc. In various embodiments, the UAV assessment and reporting system may be preloaded geographic hazard models. The UAV roof analysis system may allow for these hazards to be eliminated from the flight plan to produce a safe path for automated imagery and data capture. The selection of the roof(s) and/or hazards may be performed through an interface on the agent's computing device using satellite images, in real-time based on images transmitted by the UAV, and/or on a previously captured nadir image of a site. Onboard sensors for obstacle avoidance may additionally or alternatively be used for the detection of hazardous obstacles, especially in situation in which incomplete geographic information is available and periodic changes are expected.

As previously noted, the UAV may include a visible spectrum camera to capture images of the structure, sonar sensors, LIDAR sensors, infrared sensors, optical sensors, radar sensors, and the like. The UAV may include one or more onboard processors and/or communication interfaces to communicate with a controller, the computing device, and/or a cloud-based software program. The UAV and/or the agent's computing device may include a non-transitory computer-readable medium for receiving and storing instructions that, when executed by the processor, cause the UAV to conduct a roof analysis, as described herein. The roof analysis may include a boustrophedonic scan of the roof. The boustrophedonic scan may include capturing images during a boustrophedonic flight pattern within a first altitude range. The boustrophedonic scan may also or alternatively include determining distances to a surface for each of a plurality of potential vertical approaches within a defined area.

The UAV roof analysis system may identify a structure on the site using the boustrophedonic scan of the area. The UAV roof analysis system may additionally or alternatively perform a loop scan of the roof. The loop scan may include a second flight pattern for the UAV to travel around the perimeter of the roof. The second flight pattern may be at a second altitude range lower than the first altitude range. Finally, the UAV roof analysis system may conduct one or more patch scan analyses on one or more of the faces of the roof in a third flight pattern that includes vertical, angular, or horizontal approaches to the roof to capture detailed images of the roof.

In various embodiments, a roof selection interface on the agent's computing device may receive, from the operator/agent, an electronic input identifying a roof. The operator may mark, via an electronic input on a roof identification interface, one or more boundaries associated with the roof, structure, and/or site. The operator may also identify, on the operator client, obstacles, boundaries, structures, and particular points of interest.

For example, an operator who is attempting to scan a residential lot may be presented with a satellite image on a tablet. The operator may select each corner of the lot to identify the boundaries of the lot. The operator may additionally or alternatively drag a finger or stylus along the outline of roof, or faces of each roof section, to mark the perimeter of the roof, or roof faces. Further, if the lot has trees or other obstacles, the operator may press and hold to identify their location and enter an estimated height. The operator may also emphasize certain portions or faces of the roof for analysis, for enhanced analysis, or to be excluded from analysis. For instance, if the operator is collecting data for an insurance claim on a house that is known to have experienced potentially damaging hail from a northwest direction, the operator may highlight the north-facing and west-facing surfaces of the roof for analysis.

A UAV may begin an analysis of a roof with a defined scanning plan to evenly scan a roof or section of a roof. During a previously defined flight plan, a UAV may detect damage through the use of artificial intelligence (AI), computer vision analysis techniques, and/or through library-matching techniques as described herein. The detected damage may be analyzed according to a ruleset and result in the UAV altering the types of scanning being performed, the level of detail being collect, and/or modify or alter a flight path in real time. Accordingly, real-time modifications to a scanning or navigation pattern may allow for more accurate and/or enhanced (e.g., more detailed) scan data to be collected on an as-needed basis.

In some embodiments, the UAV roof analysis system may automatically identify obstacles, boundaries, structures, and particular points of interest using satellite images, county records, topographical maps, and/or customer statements. For example, the UAV roof analysis system may receive an address of a commercial property to be assessed for damage caused by a tornado. The UAV roof analysis system may use available county records to determine the boundary of the property and location of the roof-bearing structure(s) thereon, and topographical maps of the area to identify objects and structures.

After a roof is identified automatically or manually, the UAV may, optionally, capture a nadir image (i.e., top down) of the entire site. The UAV roof analysis system may use the nadir image to align the UAV with landmarks established in the initial identification of the site, structure, and/or roof. The UAV roof analysis system may also use the nadir image to generate a flight pattern or adjust a predefined flight pattern to ensure accuracy and uniformity. The flight pattern may include any combination of three flight stages: (1) a boustrophedonic scan, (2) a loop scan, and (3) a micro scan that optionally includes patch scan analyses. In some embodiments, a roof analysis may require only one or two of the three types of scans. Thus, in some embodiments, one or more stages may be omitted. For instance, in some situations the roof may be identified during semi-autonomous navigation of the UAV by the operator. Patch scans of one or more faces of the roof may then be automatically performed. Thus, a full-subject image may only include the face of interest on the roof or even a particular patch on a face of a roof.

An operator may manually navigate a UAV to a location proximate a face of a roof. Autonomously, or in response to an operator request, the UAV roof analysis system may conduct a patch scan analysis of the roof face. In some embodiments, the UAV system may direct the operator to (1) navigate the UAV up, down, left, right, forward, or backward and/or (2) change the angle of a sensor system (e.g., camera) on the UAV to facilitate a patch scan analysis. In another embodiment, once the UAV has been positioned proximate a face of a roof by an operator, a "perform patch analysis" button may be selected and the UAV roof analysis system may autonomously navigate the UAV to the correct location by making minor positional adjustments and/or adjust sensor systems as needed to perform one or more patch scan analyses on the face of the roof. In still other embodiments, as described herein, the entire processes from takeoff to landing may be automated and patch scan analysis(es) may be conducted for one or more faces of the roof of a structure.

In embodiments utilizing a boustrophedonic scan, the UAV may follow a flight pattern where the UAV travels from edge to edge of the site or roof edges in alternating offset zones (or slightly beyond each edge of a roof or slightly less than each edge of a roof). The camera or other sensing system on the UAV may capture images of the roof as the UAV travels in the boustrophedon pattern. The UAV roof analysis system may merge the images to form a detailed aerial view of the roof and/or underlying structure and site. The level of detail in the detailed aerial view may be improved by lowering the altitude of the UAV and using minimal offsets. However, the altitude used for a boustrophedonic scan may be limited due to the height of structures and obstacles on the site.

In some embodiments, the boustrophedonic scan alone may be used to develop a top-down or aerial view of the roof. In other embodiments, the images and scan information obtained during the boustrophedonic scan may be combined with other available data or used to refine other available data. The scan information may, as previously described, include information from optical imaging systems, ultrasonic systems, radar, LIDAR, infrared imaging, moisture sensors, and/or other sensor systems.

During a second scan stage, the UAV may perform a loop scan to analyze the angles of a structure. The loop scan may include a flight pattern that positions the UAV at the perimeter of the structure and/or the site. The loop scan may include the UAV traveling around the perimeter. As the UAV travels around the perimeter, the UAV may lower its altitude for sensor system to capture images of the roof at one or more angles. The angles at which sensor data is captures may be oblique or perpendicular to the face(s) of the roof laterally and/or vertically. The UAV roof analysis system may use these images to create a three-dimensional model of the structure.

In various embodiments, the UAV may make multiple passes around the perimeter of the structure at different altitudes. For example, the UAV may fly around the perimeter at a first altitude to capture images of the structure at a first vertical angle, and then fly around the perimeter at a second altitude to capture additional images of the structure at a second vertical angle. The images may be captured at the two vertical angles with the sensors horizontally perpendicular or oblique to the faces of the roof. The number of passes around the perimeter and the lowering of UAV altitude after each pass may vary based on a desired assessment or report. Each additional pass may provide more accurate and/or supplemental images for a three-dimensional model, construction assessment, solar panel installation assessment, and/or damage assessment. It is appreciated that the term "image" is used broadly herein to include visible-spectrum images as well as 'images' captured using alternative sensor types, such as infrared, ultraviolet, and ultrasonic sensor systems.

During a third scan stage, the UAV may perform a micro scan for close-up extremely detailed data capture of the roof using one or more sensors and/or sensor types. For examples, tens, hundreds, thousands, or even millions of pixels of sensor data may be used to capture each square inch of a roof or other surface or subsurface. The level of detail far exceeds that available via other types of aerial imaging for a given sensor system. The micro scan may include patch scans of one or more faces of the roof. The micro scan of the roof may provide detailed images (visible spectrum or otherwise) for analyzing the roof. The granularity from the micro scan may assist in detailed measurements, damage identification, and material identification. For example, the micro scan may allow an insurance adjuster to zoom in on a two- or three-dimensional model of the structure to view and assess a patch of roof with a predetermined size and/or shape.

A patch scan may comprise an analysis of a region of a roof having a predetermined square footage, size, shape, and/or relative location. The patch scan analysis may identify damage, assess the severity of the damage, identify colors, materials, etc. An assessment of the severity of the damage is not subjective. Rather, the severity of the damage may be categorized based on material type and be objectively associated with a loss of life expectancy, reduced structural integrity, water permeability, loss in insulation qualities, loss of reflective qualities, and/or an objective loss of aesthetic appeal (e.g., a percentage of pixels mismatched as compared to an undamaged portion of the roof). Thus, in a basic embodiment the size of a damage point alone may be used to assign a severity value to the damage point.

One or more of the scan stages described herein may be performed multiple times, or alternatively omitted from the process. For example, in various embodiments the flight pattern may include a boustrophedonic scan. Information gained during the boustrophedonic scan may be used to perform a loop scan. Information gained during the loop scan may be used to perform a more accurate boustrophedonic scan. That process may be repeated as many times as is desired or necessary to obtain sufficient information about a property or structure to perform a suitably detailed or accurate micro scan with patch analysis(es) on one or more faces of the roof.

In various embodiments, to perform the patch scans, the UAV may perform a series of vertical descents toward the rooftop or alternatively horizontal approaches to the rooftop. For instance, the UAV may begin in a starting position at the base altitude (or horizontal distance) and lower its altitude (or decrease its horizontal distance) until it is at a target distance from the rooftop. In various embodiments, the camera or other sensor system on the UAV may capture an image when the target distance is reached. In another embodiment, the camera may take a set of images as the UAV approaches the rooftop. After the image at the target distance is captured, the UAV may return to the further distance and travel a target lateral distance and once again approach that roof to a target distance. In some embodiments, the images may slightly overlap to ensure coverage of the entire structure. In other embodiments, a single patch scan (or other predefined number of patch scans) from each face of the roof may be sufficient. The UAV may continue to perform approaches separated by a defined lateral distance until the entire rooftop has been assessed or until the desired number of patch scans per face of the roof have been completed.

While compatibility with industry standard patch sizes may be useful in some embodiments, in other embodiments it may be preferred to conduct a detailed analysis of the entire structure or entire roof. Moreover, computer vision techniques, computer learning algorithms, and/or artificial intelligence techniques may be employed in combination with one or more of the embodiments described herein. For example, in some embodiments, computer vision (CV) techniques may be employed to detect damage of both interior and exterior surfaces and sub-surfaces of a structure. Examples of these techniques include, but are not limited to, pattern recognition, edge detection, measurements, ratio analysis, etc.

Thus, while traditional patch analysis requires a human adjuster to inspect a roof and draw a 10'×10' sample using chalk, this is largely to reduce the workload of the adjuster or other evaluator. The thought is that the sample is large enough to be representative of the rest of the roof and so there is no need to do a complete analysis. This can lead to inaccurate conclusions, incorrect repairs, and time and money being spent for naught. Using the systems and methods described herein, real-time adaptive analysis of an entire roof or entire face of a roof may be performed. For instance, the systems and methods described herein may be used to automatically detect damage, such as hail, over the entire surface of the roof thereby eliminating the need for a manual inspection process.

In various embodiments, each patch scan may be performed with image sensors orthogonal to the rooftop at a center of the patch scan. For instance, a 10'×10' patch scan may comprise positioning the UAV a predefined distance from the surface of the roof at a center point of the 10'×10' patch with the sensor(s) orthogonal to the patch of roof.

In another embodiment, to perform the micro scan, the UAV may traverse the rooftop at a target lateral distance and sensors may capture images and other sensor data as the UAV travels in a boustrophedonic or loop pattern. To avoid a collision, the UAV may use integrated sensors and/or data captured during a prior loop scan or boustrophedonic scan.

In some embodiments, a UAV may utilize artificial intelligence, computer vision techniques, and/or computer learning algorithms to optimize a flight plan and navigate safes during each flight based on real-time scanning and sensor data. Each subsequent flight or scanning session may be used to update a knowledge base of hazards and other features of a property or flight pattern.

In various embodiments, the UAV may include proximity sensors. The proximity sensors may be used to avoid obstacles on and surrounding the roof and thereby identify safe flight areas above and proximate the roof and surrounding objects. The proximity sensors may also be used to determine how close the UAV is to the structure. For example, a UAV may be programmed to capture images at a distance of five feet from the structure. The proximity sensors may send a signal indicating to the UAV that it has reached the target distance, five feet, and the camera may capture sensor data in response to the signal. The target distance may be adjusted based on desired detail, weather conditions, surface obstacles, camera resolution, camera field of view, and/or other sensor qualities. In some embodiments, infrared and other non-optical sensors may be used to provide additional assessment data. For example, materials may be identified based on a spectral analysis and/or damage may be identified based on infrared leaks in a structure.

In other embodiments, the UAV may use additional and/or alternative methods to detect proximity to obstacles and the structure. For example, the UAV may use topographical data. As another example, the UAV may have a sonar system that it uses to detect proximity.

Additionally, in some embodiments, the UAV roof analysis system may perform multiple micro scans with different levels of resolution and/or perspective. For example, a first micro scan with patch analysis may provide detailed images at 10 or 20 feet above a roof. Then a second micro scan with patch analysis may image a portion of the roof at five feet for additional detail of that section. This may allow a faster capture of the roof overall while providing a more detailed image set of a portion of interest. In various embodiments, the UAV roof analysis system may use the first micro scan to determine the portion to be imaged in the second micro scan.

In some embodiments, the UAV roof analysis system may use each scan stage to improve the next scan stage. For example, the first scan stage may identify the location of objects. Sonar or optical sensors may be used in the first scan stage to identify the height of the objects and/or physical damage. The location and height of the objects identified in the first scan stage may determine where the loop scan occurs and the altitude at which the angled images are captured. Further, the first and second stages may identify particular points of interest. The third stage may use the particular points of interest to determine the location of the micro scans. For example, during a loop scan, the autonomous flying system may identify wind damage on an east-facing portion of the roof. The micro scan may then focus on the east-facing surface of the roof. The identification of particular points of interest may be done using UAV onboard image processing, server image processing, or client image processing.

The UAV roof analysis system may automatically calculate a pitch of a roof. In a first embodiment, the UAV roof analysis system may use the UAV's sonar or object detection sensors to calculate the pitch of the roof. For example, the UAV may begin at an edge of the roof and then travel toward the peak. The pitch may then be calculated based on the perceived Doppler effect as the roof becomes increasingly closer to the UAV as it travels at a constant vertical height. In a second embodiment, the UAV may land on the roof and use a positioning sensor, such as a gyroscope, to determine the UAV's orientation. The UAV roof analysis system may use the orientation of the UAV to determine the slope.

In some embodiments, a UAV may hover above the roof but below a peak of the roof. Sensors may determine a vertical distance to the roof below and a horizontal distance to the roof, such that the roof represents the hypotenuse of a right triangle with the UAV positioned at the 90-degree corner of the right triangle. A pitch of the roof may be determined based on the rise (vertical distance downward to the roof) divided by the run (horizontal forward distance to the roof).

In some embodiments, a UAV may hover above the roof at a first location and measure a vertical distance from the UAV to the roof (e.g., downward). In one such embodiment, a downward sensor may be used. The UAV may then move horizontally to a second location above the roof and measure the vertical distance from the UAV to the roof. Again, the roof becomes the hypotenuse of a right triangle, with one side of the triangle corresponding to the horizontal difference between the first location and the second location, and the second side of the triangle corresponding to the vertical difference between the distance from the UAV to the roof in the first location and the distance from the UAV to the roof in the second location.

In some embodiments, a UAV may hover above the roof at a first location and measure a horizontal distance from the UAV to the roof. In such embodiments, a forward, lateral, and/or reverse, sensor may be used. The UAV may then move vertically to a second location above the roof and measure the horizontal distance from the UAV to the roof. Again, the roof becomes the hypotenuse of a right triangle, with one side of the triangle corresponding to the vertical difference between the first location and the second location, and the second side of the triangle corresponding to the horizontal difference between the distance from the UAV to the roof in the first location and the distance from the UAV to the roof in the second location.

In some embodiments, the UAV roof analysis system may use three or more images and metadata associated with those images to calculate the pitch of the roof. For example, the UAV may capture a first image near the roof. The UAV may then increase its altitude and capture a second image above the first image. The UAV may then fly laterally towards the peak of the roof until the proximity of the UAV to the roof is the same as the proximity of the first image. The UAV may then capture a third image. Each image may have metadata associated with it including GPS coordinates, altitude, and proximity to the house. The UAV roof analysis system may calculate the distance of the roof traveled based on the GPS coordinates and altitude associated with the three images using the Pythagorean theorem. The UAV roof analysis system may then calculate the pitch by taking the ratio of the altitude and the distance of the roof traveled.

In some embodiments, to maintain stationary a UAV may have to tilt the body and/or one or more propellers to compensate for wind or other environmental factors. For various measurements and scans described herein, the images, measurements, and/or other captured data may be annotated to identify the tilt or angle caused by the UAV tilt. In other embodiments, the sensors, cameras, and other data capture tools may be mechanically or digitally adjusted, such as gyroscopically, for example. In some embodiments, measurements, such as distances when calculating skew and/or roof pitch, may be adjusted during calculations based on identified UAV tilt due to environmental factors. Similar measurements from various points relative to the roof may be used to identify sagging or bulging portions of the roof that fit within a patch size or are larger than a patch size.

The UAV may use the calculated pitch to adjust the angle of the camera to reduce image skew during a micro scan and/or loop scan. For example, once the pitch is calculated the UAV may perform a micro scan with the camera at a perpendicular angle to the roof and/or de-skew the image using software on the UAV, during post-imaging processing, and/or through cloud-based processing. In various embodiments, the calculated pitch is used to angle the camera so it is perpendicular (orthogonal) to the roof to eliminate skew during patch scan analyses.

In some embodiments, a pitch determination system may determine a pitch of the roof based on at least two distance measurements, as described above, that allow for a calculation of the pitch. An imaging system of the UAV may capture an image of the roof of the structure with the optical axis of the camera aligned perpendicular to a plane of the roof of the structure by adjusting a location of the UAV relative to a planar surface of the roof and/or a tilt angle of the camera of the UAV.

The UAV roof analysis system may also reduce and/or identify shadows in the images by calculating the current angle of the sun. The UAV roof analysis system may calculate the angle of the sun based on the time of the day, the day of the year, and GPS location. To eliminate the UAV's shadow from appearing in captured images, the UAV roof analysis system may apply the angle of the sun to the current UAV position in flight. The UAV position, the angle/position of the sun, and the relative location of surfaces and structures (e.g., roof) may determine precisely where the shadow of the UAV will appear. The UAV may adjust its position and camera based on the location of the roof shadow to ensure that each photograph will be captured in such a way as to completely eliminate the UAV's shadow.

In some embodiments, the UAV roof analysis system may also use the angle of the sun to determine the best time of day to photograph a site or portion of a site. For example, the shadow of an object on a site may obscure a structure during the morning. Based on the angle of the sun, the UAV roof analysis system may determine what time of day the shadow would no longer obscure the structure. The UAV may autonomously collect images during different times of day to ensure that shadow-free images of all, most, or specific portions of the structure are captured during boustrophedonic, loop, and/or micro scans. The systems and methods described herein are repeatable on a consistent basis for various properties and structures and are therefore aptly characterized as systematic.

In other embodiments, a shadow determination system (local or remote) may calculate (as opposed to directly observe) a location of a shadow cast by the proximate object onto the structure based on a current location of the sun, which can be accurately determined based on a current time and a GPS location of the structure. The imaging system may account for the shadow by (1) annotating images of the structure that include the calculated shadow, (2) adjusting an exposure of images of the structure that include the calculated shadow, and/or (3) identifying a subsequent time to return to the structure to capture non-shadowed images of the portions of the structure that are currently shadowed.

The UAV, server, and operator client may be connected via one or more networks. For example, the UAV may transmit images to the server via a cellular network. Additionally, the UAV may connect to the client via a second network such as a local wireless network. The UAV, server, and operator client may each be directly connected to each other, or one of the elements may act as a gateway and pass information received from a first element to a second element.

A standard flight plan may be saved on the server. The standard flight plan may be loaded on the UAV and altered based on information entered by the operator into the operator client interface. The UAV (e.g., via onboard or cloud-based processors) may also alter the standard flight plan based on the images captured and/or other sensor data.

In some embodiments, the system may generate all or part of a navigational risk zone. A navigational risk zone may include some or all the area within which an autonomous vehicle, such as a UAV, may navigate to perform micro scans of the roof. For example, a rectangular office building may be associated with a navigational risk zone represented by an envelope surrounding a rooftop of the office building along with takeoff and landing approaches.

The navigational risk zone may include one or more navigational risk tag associated with specific locations relative to the roof. For example, if a tree is identified as having branches overhanging some portions of the rooftop, the portions below the overhanging branches may be tagged with a navigational risk tag indicating that an obstruction is overhead. A navigational risk tag may simply indicate the existence of the overhead obstruction. Alternatively, the navigational risk tag may provide additional detail, such as distance from the current location to the obstruction, the type of obstruction, or a flight pattern modification to avoid the obstruction.

A navigational risk tag may include a wide variety of warnings, notices, or other relevant information for the location. Examples of a navigational risk tag include, but are not limited to: identification of standing water, ice, or snow that may make sensor readings inaccurate; an obstruction that is more easily seen or detected from some vantage points than others (e.g., a net or wire); a feature or characteristic of the property that may be subsequently misidentified (e.g., a skylight might be mistaken as standing water on a roof and erroneously scanned); a feature or characteristic of the property that may necessitate addition or more careful scanning; high value items that should be avoided by a set distance (e.g., a car in a driveway); and/or other tags.

A UAV system may include onboard processing, onboard storage, communications systems, access to cloud-based processing, and/or access to cloud-based storage. The system may utilize one or more of these resources to analyze, image, and/or otherwise scan the roof. In some embodiments, the system may utilize computer vision in combination with a library of images for identifying properties, characteristics of properties, problems, defects, damage, unexpected issues, and the like.

The inclusion of computer vision intelligence may be adapted based on the use of computer vision in other fields and in its general form for use in UAV roof analysis. Computer visional analysis may include various systems and methods for acquiring, processing, analyzing, storing, and understanding captured images. The system may include digital and analog components, many of which may be interchangeable between analog and digital components. Computer vision tasks may be performed in the cloud or through onboard processing and storage. The computer vision system of the UAV may execute the extraction of high-dimensional data from captured images (optical, infrared, and/or ultraviolet) and other sensor data to produce numerical or symbolic information.

The computer vision systems may extract high-dimensional data to make decisions based on rule sets. As such, a rule-based analysis of roofs may be performed in a systematic, uniform, and repeatable manner. The computer vision systems may utilize images, video sequences, multi-dimensional data, time-stamped data, and/or other types of data captured by any of a wide variety of electromagnetic radiation sensors, ultrasonic sensors, moisture sensors, radioactive decay sensors, and/or the like.

Part of the analysis may include profile matching by comparing captured sensor data with data sets from a library of identifiable sensor profiles. An evaluator module or system may be responsible or partially responsible for this analysis. Such an analysis may be performed locally and/or in the cloud. For example, images of different types of shingles (e.g., asphalt, cedar, and clay) may be used to determine which type of shingle is on a roof being analyzed. Upon a determination that the shingles are asphalt, the system may compare captured images of the asphalt shingles on the roof with a library of defects in asphalt shingles to identify matching defects. The system may also use computer vision analysis techniques, artificial intelligence decision making techniques, optionally in combination with a library of data to modify alter the flight plan or path in real-time based on materials and/or damage that is detected.

For example, during a scanning process, one or more sensors may collect information that may be used to query a rule set. The rule set may modify a navigation pattern, flight direction, scan type, scan details, or other action taken or being taken by the UAV in response to a rule set's interpretation of the collected information.

As another example, a thermal scan of asphalt shingles may reveal a thermal profile data set that can be compared with a library of thermal profiles. A matched profile may be used to determine that the roof is undamaged, damaged, aging, poorly constructed, etc. In some embodiments, a first sensor system may be used and, if a matched profile is found, the system may follow a rule set to take a subsequent action that is different from the action that would have been taken if no matched profile had been found. An evaluator system or module (hardware, firmware, or software) may evaluate various inputs to make a decision and/or determine that human operator input is required.

In one example embodiment, an optical scan may be used to match profiles within the library that indicate that a portion of the roof may have a particular characteristic (e.g., damage, manufacturing material, construction material, construction methods, modification from prior specification, etc.). A rule set may dictate that, based on the matched profile within the library, another type of sensor system should be used for a subsequent scan and/or indicate that a scan with increased resolution or detail is warranted. In some embodiments, a three-dimensional representation of the roof may be visualized on an agent's computing device. The agent or homeowner may click on a location on the three-dimensional representation to view micro scans, such as a patch scan.

As above, numerous examples and descriptions are given with respect to roof surfaces and roof subsurfaces. Roofs are merely one example of a surface or subsurface that can be analyzed and/or scanned using the systems and methods described herein. Many, if not all, of the embodiments and combinations of embodiments of the systems and methods described herein may be applied to various exterior and interior surfaces of a structure or other property.

The term "surface or subsurface" as used herein is used in an inclusive sense such that scanning or analyzing "a surface or subsurface" may include scanning or scanning or analyzing the surface, the subsurface, or both the surface and the subsurface. A surface may include any exposed surface of a structure or other property. A subsurface may include anything beneath, behind, hidden, or obscured by the surface to one or more sensor types.

For instance, an optical imaging sensor may be used to scan a surface of a roof. An infrared imaging sensor may be used to scan a surface of a roof as well, but may also be used to image thermal variations in the subsurface of the structure, such as embedded moisture, underlying structural members, and the like.

Some of the infrastructure that can be used with embodiments disclosed herein is already available, such as: general-purpose computers, computer programming tools and techniques, digital storage media, communications networks, and data ports (such as USB, optical drives, DisplayPort, antennas for wireless data transfer, SATA, PCIe, and the like). A computer may include a processor, such as a microprocessor, microcontroller, logic circuitry, or the like. The processor may include a special-purpose processing device, such as an ASIC, a PAL, a PLA, a PLD, a CPLD, a Field Programmable Gate Array (FPGA), or other customized or programmable device. The computer may also include a computer-readable storage device, such as non-volatile memory, static RAM, dynamic RAM, ROM, CD-ROM, disk, tape, magnetic memory, optical memory, flash memory, or other computer-readable storage medium.

Suitable networks for configuration and/or use, as described herein, include any of a wide variety of network infrastructures. Specifically, a network may incorporate landlines, wireless communication, optical connections, various modulators, demodulators, small form-factor pluggable (SFP) transceivers, routers, hubs, switches, and/or other networking equipment.

The network may include communications or networking software, such as software available from Novell, Microsoft, Artisoft, and other vendors, and may operate using TCP/IP, SPX, IPX, SONET, and other protocols over twisted pair, coaxial, or optical fiber cables, telephone lines, satellites, microwave relays, modulated AC power lines, physical media transfer, wireless radio links, and/or other data transmission "wires." The network may encompass smaller networks and/or be connectable to other networks through a gateway or similar mechanism.

Aspects of certain embodiments described herein may be implemented as software modules or components. As used herein, a software module or component may include any type of computer instruction or computer-executable code located within or on a computer-readable storage medium, such as a non-transitory computer-readable medium. A software module may, for instance, comprise one or more physical or logical blocks of computer instructions, which may be organized as a routine, program, object, component, data structure, etc., that perform one or more tasks or implement particular data types, algorithms, and/or methods.

A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

Some of the embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Further, those of skill in the art will recognize that one or more of the specific details may be omitted, or other methods, components, or materials may be used. In some cases, operations are not shown or described in detail. Thus, the following detailed description of the embodiments of the systems and methods of the disclosure is not intended to limit the scope of the disclosure, as claimed, but is merely representative of possible embodiments.

FIG. 1 illustrates an electronic display 100 displaying a full-subject image 105 of a property imported into an annotation and reporting system, according to various embodiments. As illustrated, the displayed window can be customized to include various logos 107 and navigational links 109 to start a new job, scan new images, reviewed previously scanned images, and/or search. Multiple people may utilize the system and log in under a particular username or via other credentials. Various data encryption, passwords, authentication systems, and the like may be utilized in combination with the presently described systems and methods. The graphical user interfaces described herein as part of the systems and methods may by themselves provide utility and advantages over prior art graphical user interfaces independent of the other features, benefits, and advantages of the systems and methods described herein.

The full-subject image 105 included in FIG. 1 illustrates a top view, or nadir image, of a structure (specifically, a residence). The full-subject view in other embodiments may encompass only a portion of a structure, a farm, a shed, a particular face of a roof, a parcel of land, and/or property (e.g., a car, tractor, industrial equipment, etc.).

Figure 2:
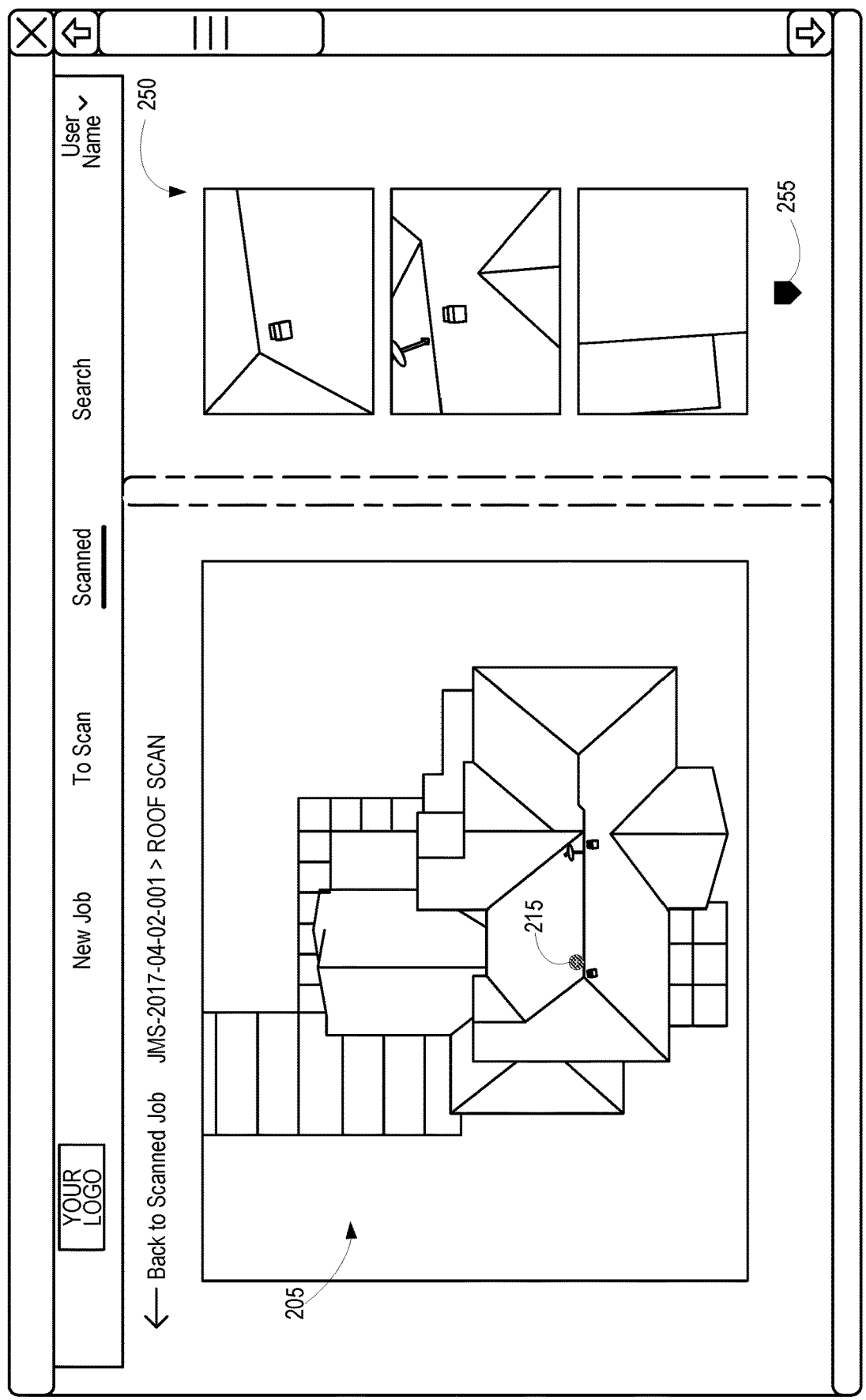
FIG. 2 illustrates detailed microscan images associated with a selected location on a roof of the full-subject image in a context-rich display layout, according to various embodiments.

FIG. 2 illustrates detailed microscan images 250 associated with a selected location 215 on a roof of the full-subject image 205 in a context-rich display layout, according to various embodiments. As illustrated, in response to the user selecting a location 215 on the roof of the full-subject image 205, the display may bifurcate and provide a contextually-rich environment in which detailed microscan images 250 are shown in one panel (or alternatively in a separate window or different display) concurrently with the full-subject image 205. The operator may scroll or otherwise navigate through various microscan images 250 via a navigation element 255, each of which is related to the selected location 215. The microscan images may be ordered based on a time take, distance to the selected location, angle relative to the selected location, and/or based on image analysis rules used to rank the quality or applicability of the various images (e.g., focus, contrast, dynamic range, etc.).

In some embodiment, mousing over or selecting a particular microscan image may move the marker on the selected location 215 to provide even more accurate contextual location information. In some embodiments, false colors, overlays, arrows, shading and/or the like may provide additional context to the operator navigating the detailed microscan images.

Figure 3:
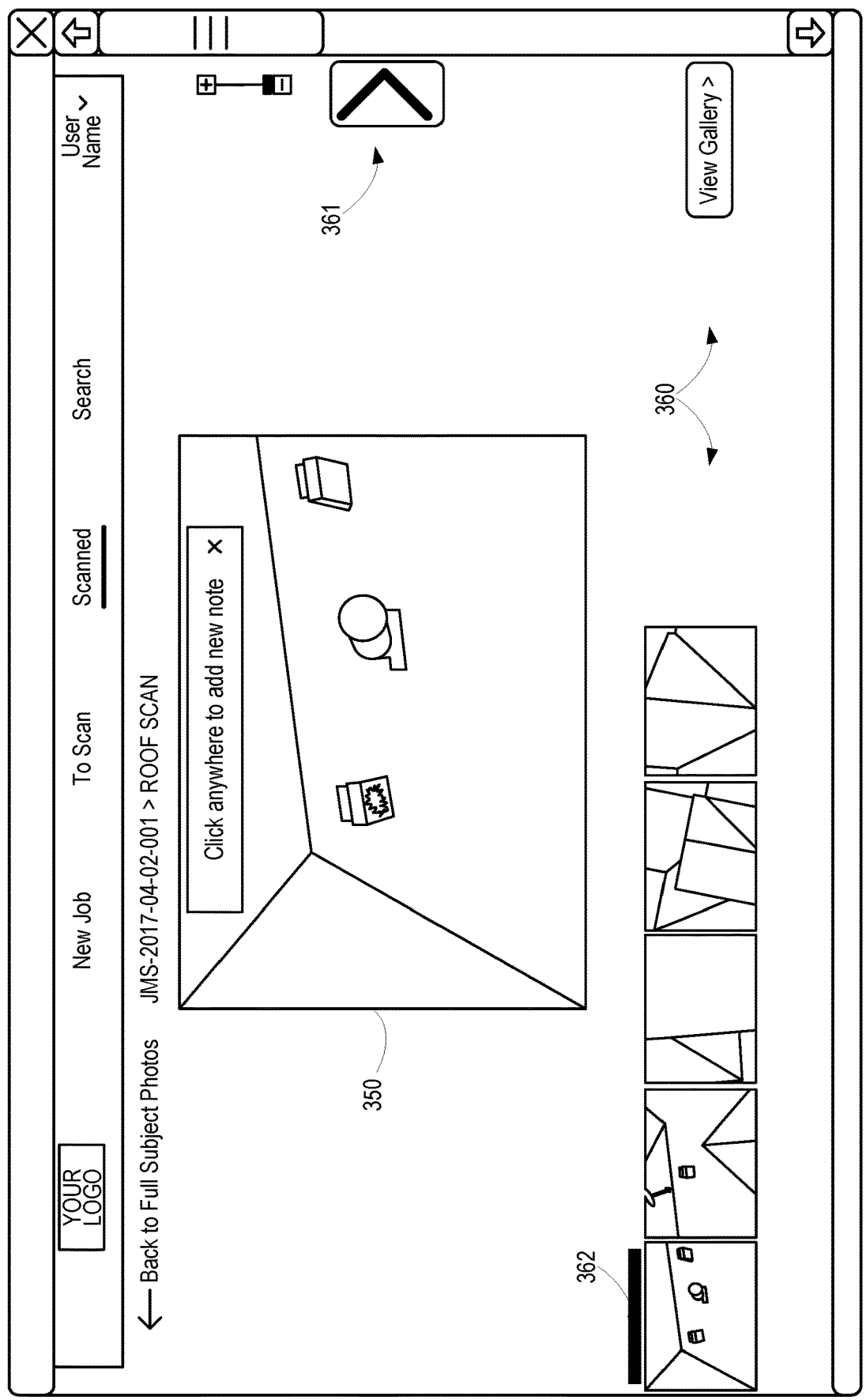
FIG. 3 illustrates a detailed image annotation display layout for the selected roof location, including an active detailed image panel and a gallery panel with other detailed images associated with the selected roof location, according to various embodiments.

FIG. 3 illustrates a detailed image annotation display layout for a selected roof location, including an active detailed image panel showing a selected microscan image 350 and a gallery panel 360 with other detailed microscan images associated with the selected roof location, according to various embodiments. As illustrated, the image displayed in the active detailed image panel is indicated by a marker 362 in the gallery panel 360. An operator may select a different image within the gallery 360 to move that image into the active detailed microscan image and/or may use navigation links, such as arrow 361 proximate or within the active detailed image panel.

Figure 4:
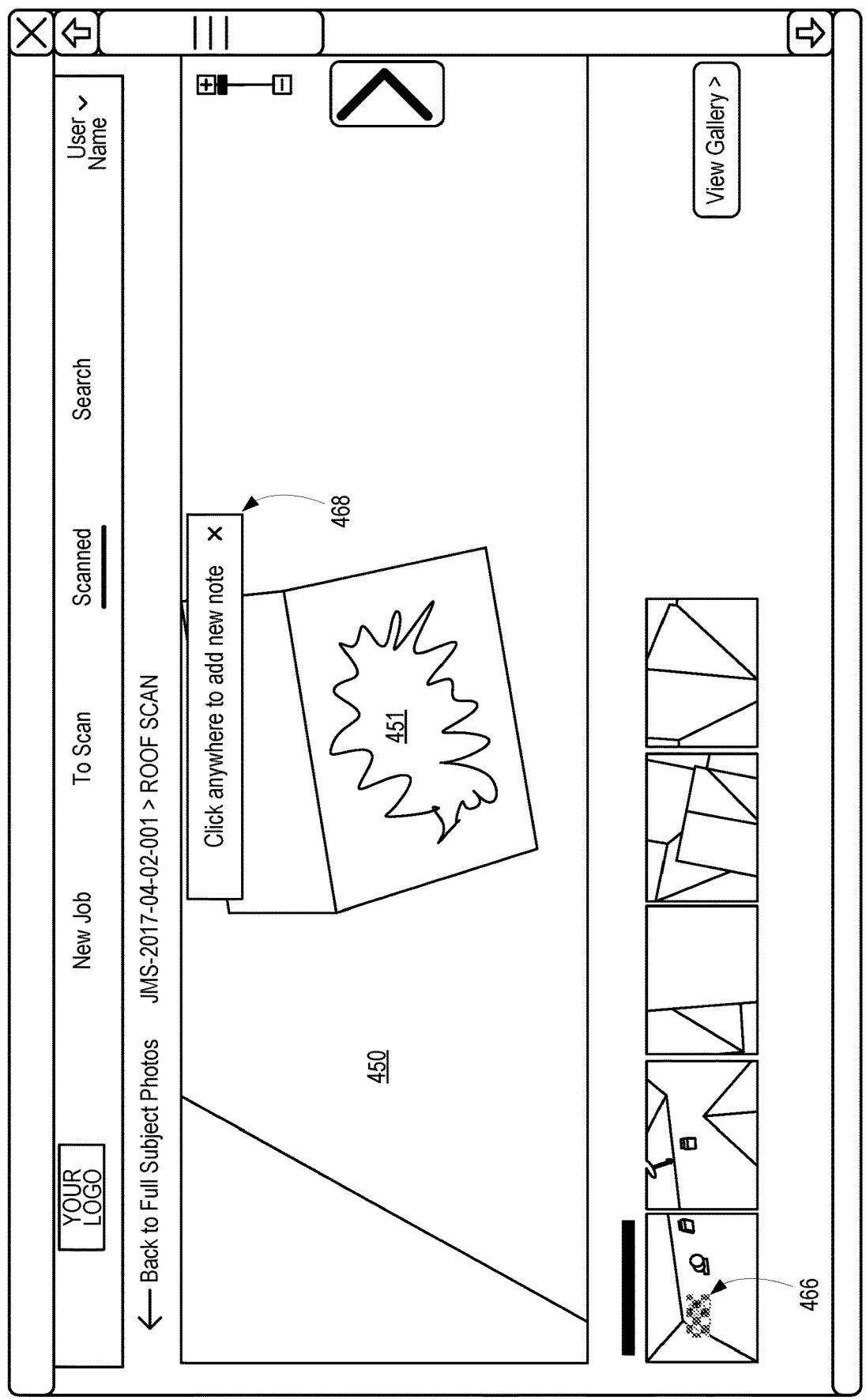
FIG. 4 illustrates a close-up view of the detailed image in the active detailed image panel with contextual shading added to the corresponding image in the gallery panel, according to various embodiments.

FIG. 4 illustrates a close-up view of the detailed image 450 in the active detailed image panel with contextual shading 466 added to the corresponding image in the gallery panel, according to various embodiments. As illustrated, an operator may click to add a note or other annotation, at 468.

Figure 5:
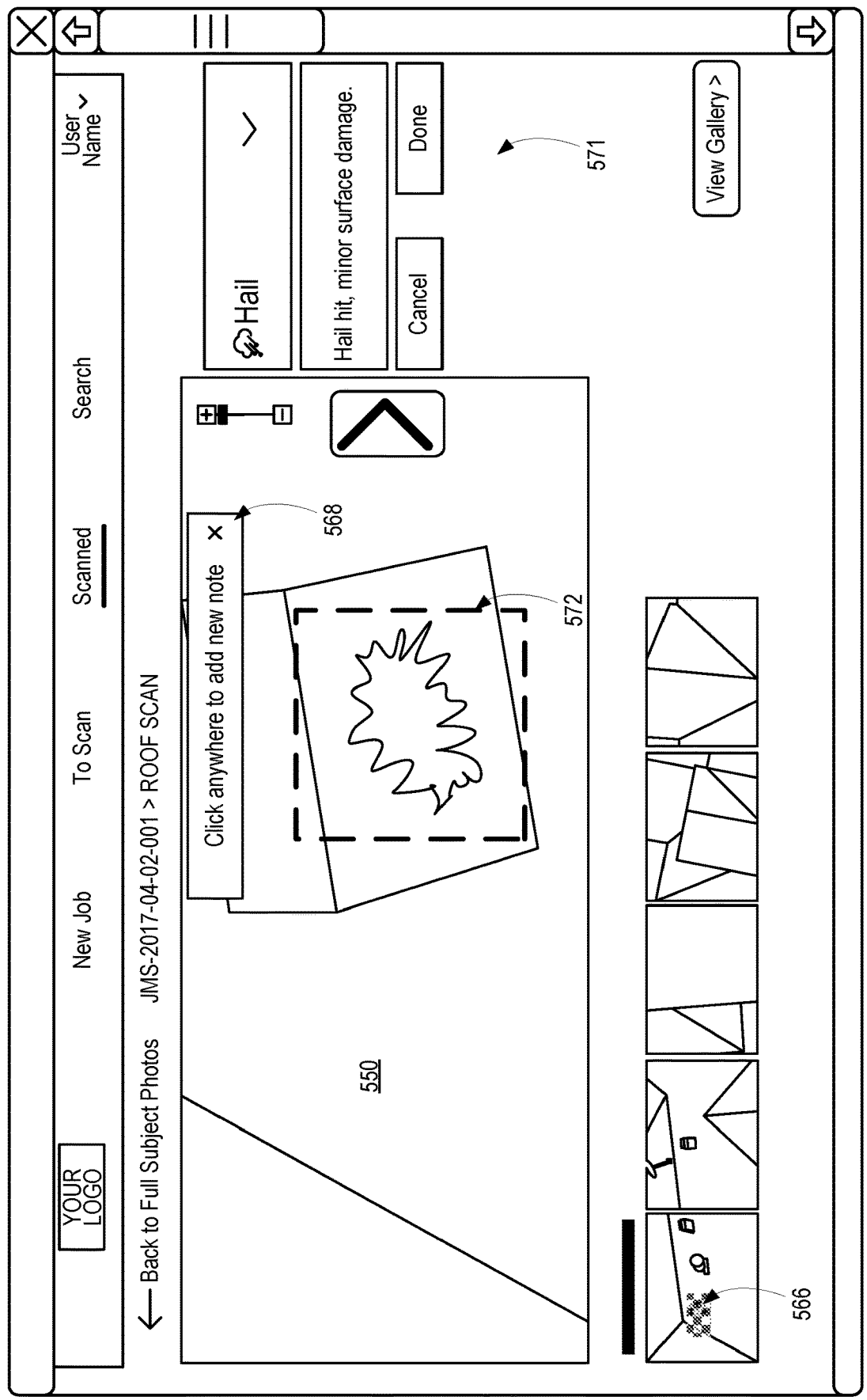
FIG. 5 illustrates a first annotation added to the detailed image in the active detailed image panel identifying the location on the detailed image as exhibiting hail damage, according to various embodiments.

FIG. 5 illustrates a first annotation 571 added to the detailed image 550 in the active detailed image panel along with an overlaid dashed box 572 identifying the location on the detailed image 550 as exhibiting hail damage, according to various embodiments. As illustrated, contextual shading 566 is provided in the corresponding image in the image gallery.

Figure 6:
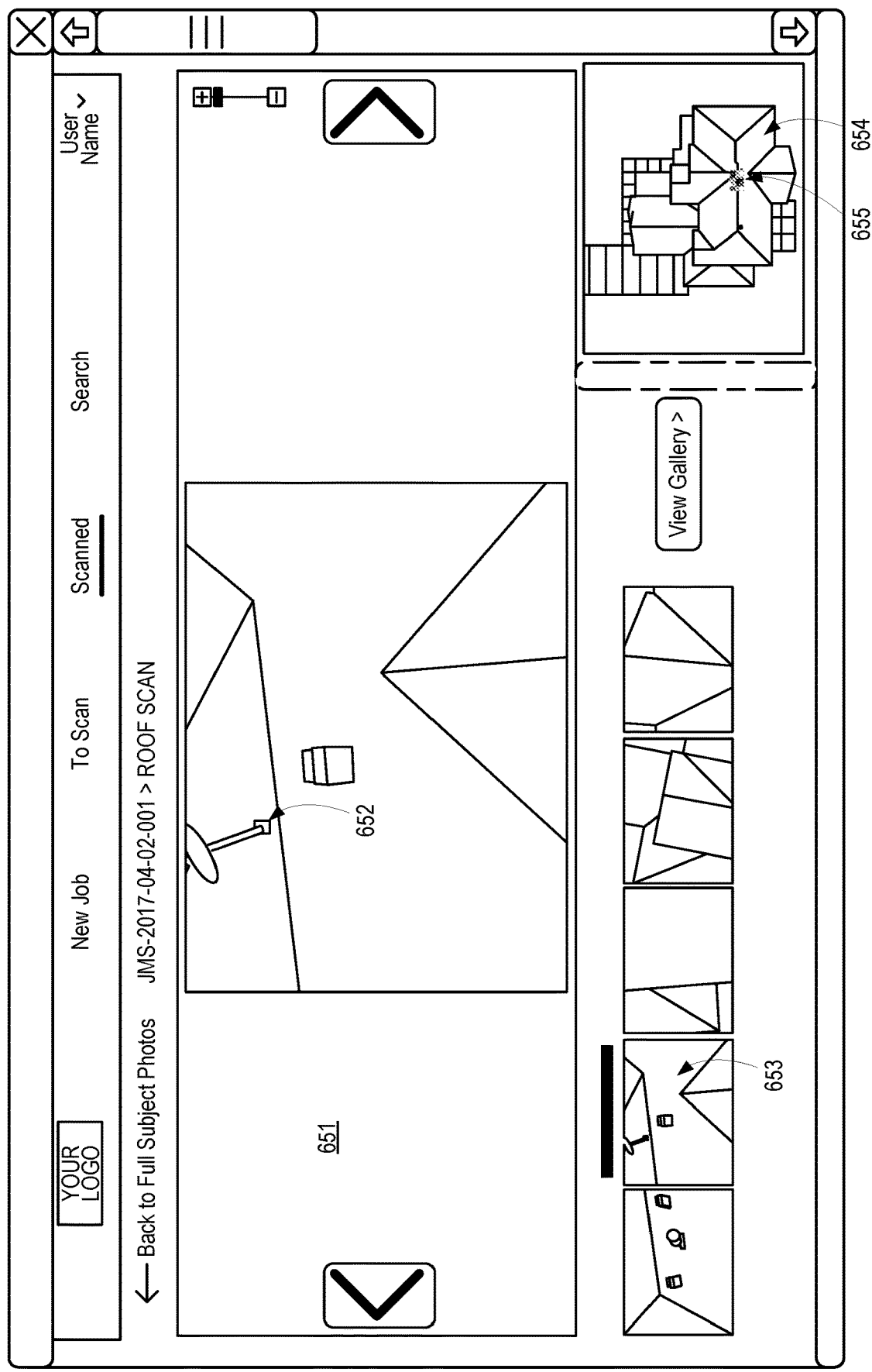
FIG. 6 illustrates the detailed image annotation display layout for the selected roof location with a second detailed image from the gallery panel displayed in the active detailed image panel, according to various embodiments.

FIG. 6 illustrates the detailed image annotation display layout for another selected roof location with a second detailed microscan image 651 from the gallery panel 653 displayed in the active detailed image panel, according to various embodiments. As illustrated, the second microscan image 651 illustrates a satellite dish 652 mounted to the roof of the structure. In addition to the gallery view 653, FIG. 6 includes an additional contextual element with a full-subject view 654 that includes shading 655 identifying the relative location of the microscan image 651 in the active detailed image panel.

Figure 7:
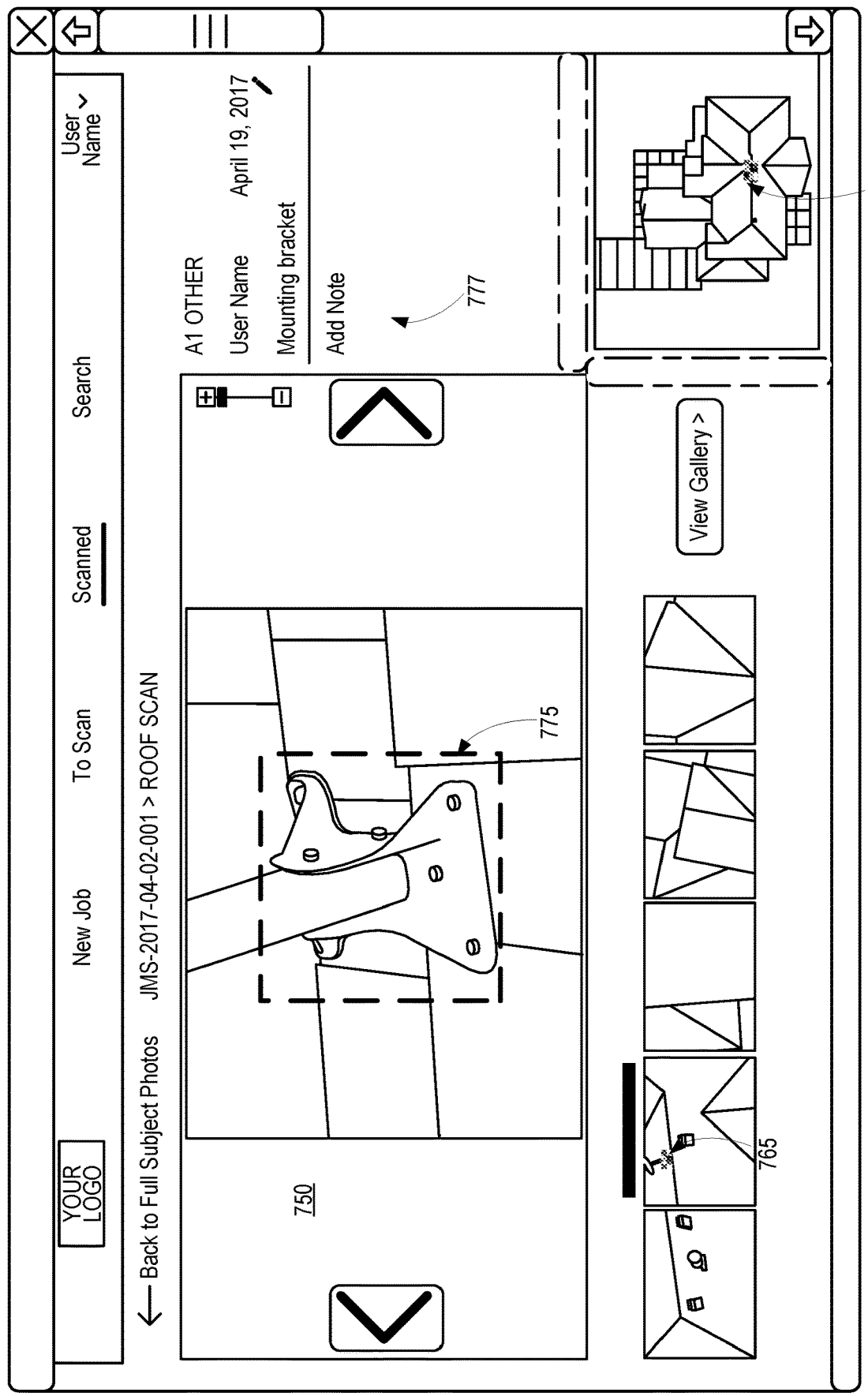
FIG. 7 illustrates a close-up view of the second detailed image in the active detailed image panel with contextual shading added to the corresponding image in the gallery panel and an associated annotation, according to various embodiments.

FIG. 7 illustrates a close-up view of the second detailed image 750 in the active detailed image panel with contextual shading 765 added to the corresponding image in the gallery panel and additional contextual shading 766 in a full-subject view panel. An annotation box 775 and an annotation identification 777 have been added by an operator. As illustrated, an operator may also add an annotation note if desired.

Figure 8:
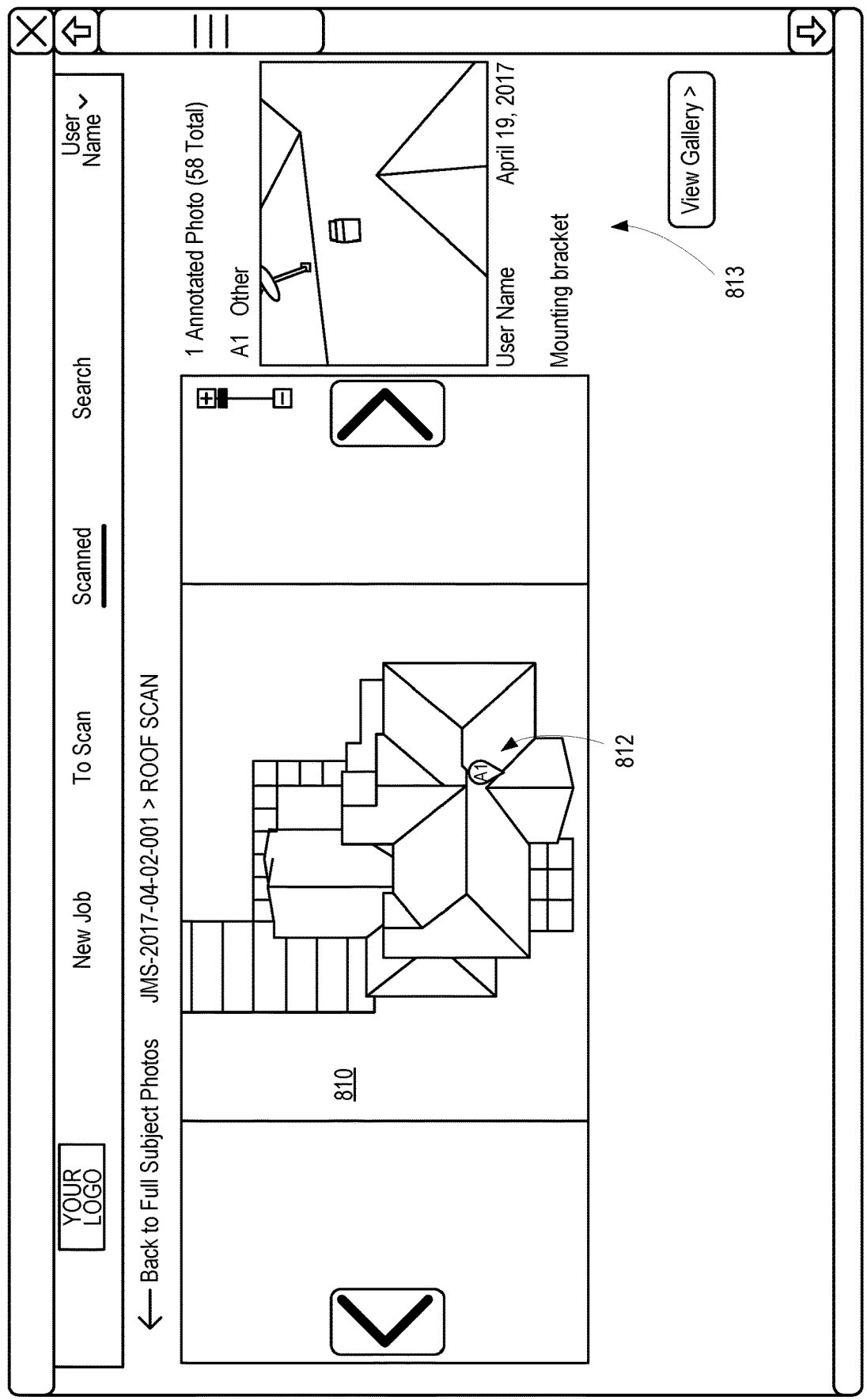
FIG. 8 illustrates a single, annotated detailed microscan image associated with a marked location on a roof of the full-subject image in a context-rich display layout, according to various embodiments.

FIG. 8 illustrates a single detailed microscan image 813 that has been annotated associated with a marked location 812 on a roof of the full-subject image 810 in a context-rich display layout, according to various embodiments.

Figure 9:
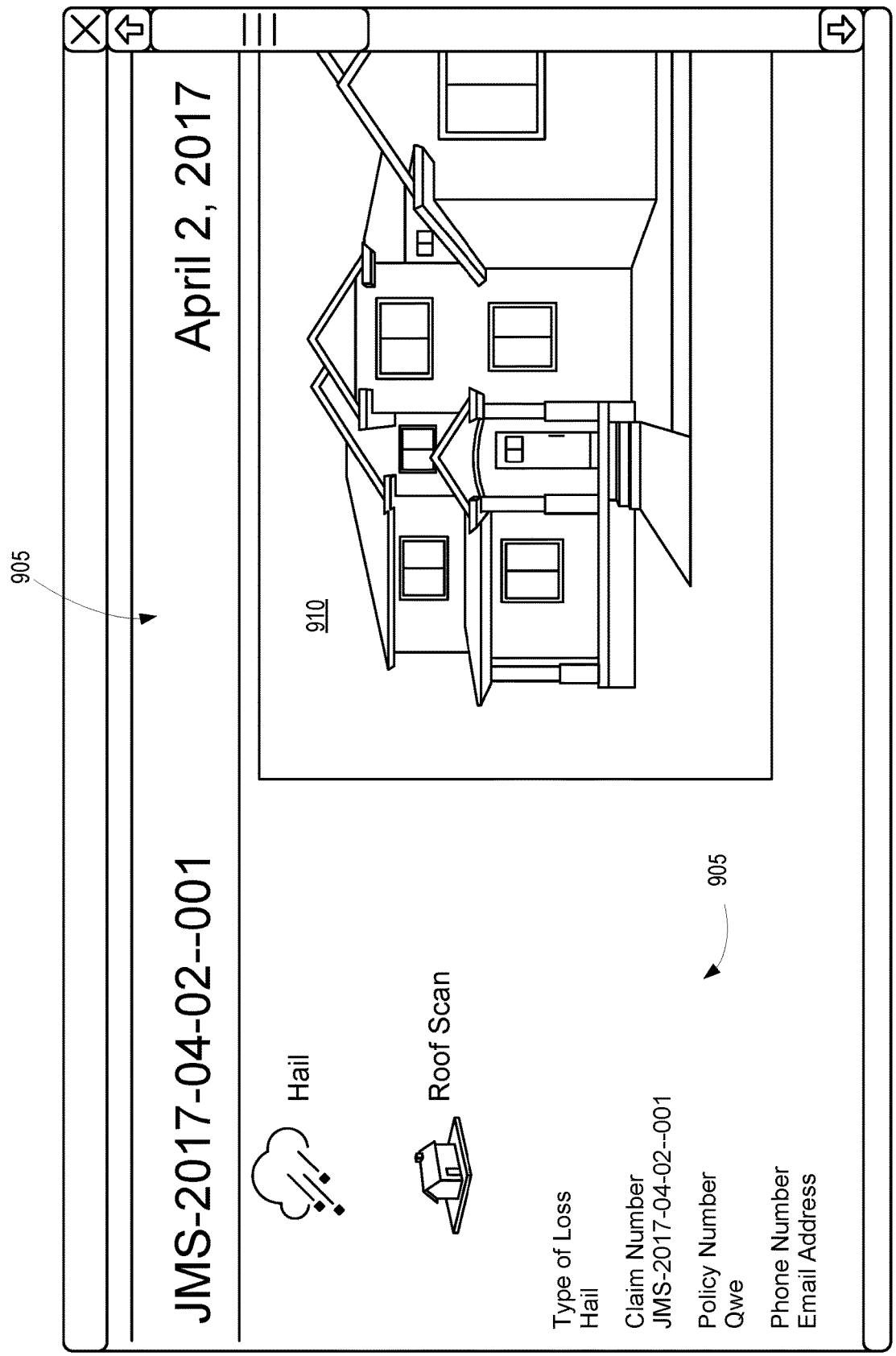
FIG. 9 illustrates a top portion of a first page of a context-rich report with annotated images, according to various embodiments.

FIG. 9 illustrates a top portion of a first page, or a title page, of a context-rich report 905 that includes identifying information 905 and a user-recognizable image of the property 910, according to various embodiments.

Figure 10A:
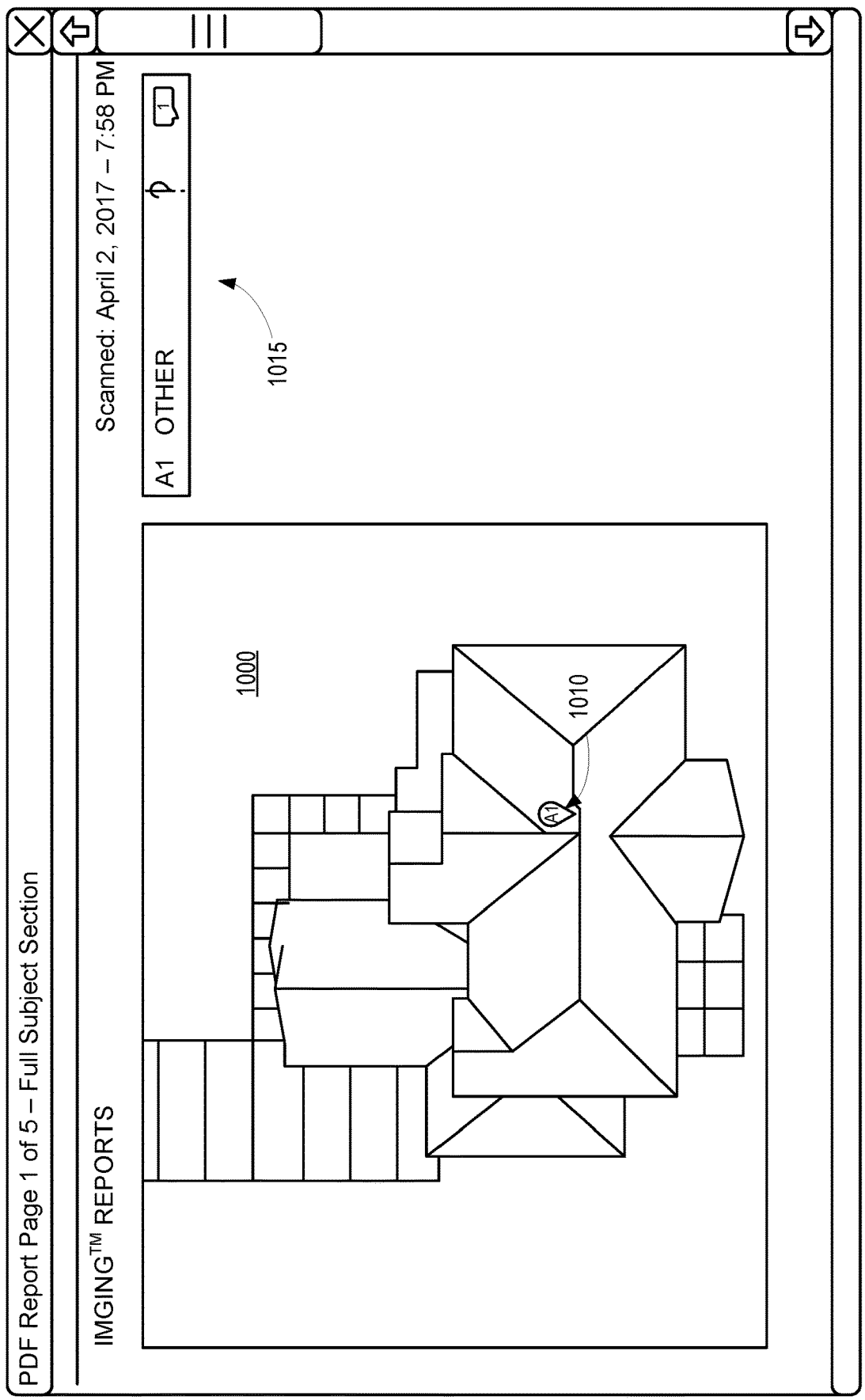
FIG. 10A illustrates a bottom portion of the first page of the report with a context-rich hyperlinked annotation for a single location, according to various embodiments.

FIG. 10A illustrates a bottom portion of the first page, or alternatively the first page, of a full subject section of the report with a context-rich hyperlinked annotation 1010 and/or 1015 for a single location on a full-subject image, according to various embodiments.

Figure 10B:
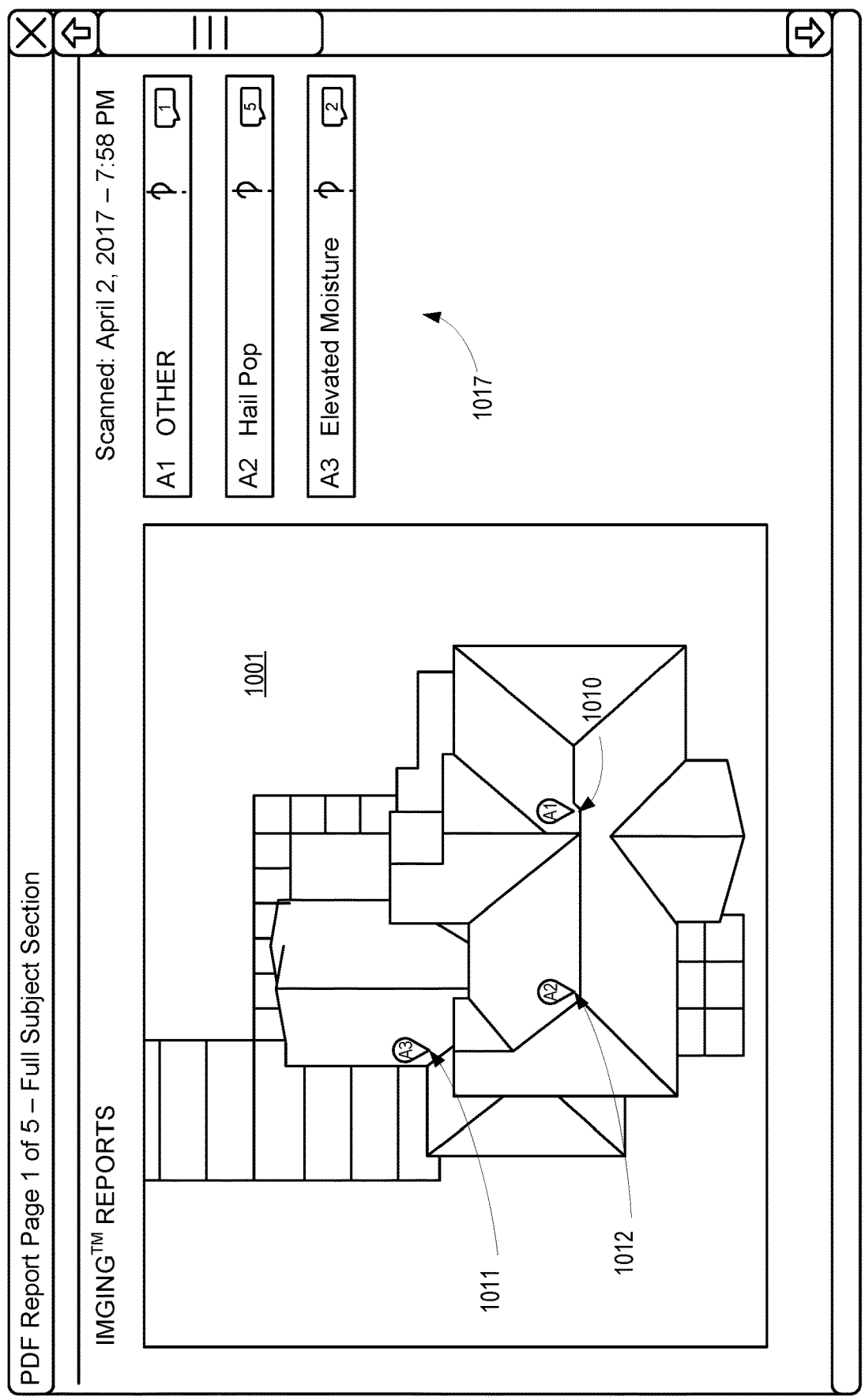
FIG. 10B illustrates an alternative bottom portion of the first page of the report with context-rich hyperlinked annotations for a plurality of locations, according to various embodiments.

FIG. 10B illustrates an alternative bottom portion of the first page of the report (or at least the first page of a full-subject section of the report) with context-rich hyperlinked annotations 1017 for a plurality of locations 1010, 1011, and 1012, according to various embodiments. As listed above, each of the locations 1010, 1011, and 1012 may be correctly labeled and described as annotations and/or as hyperlinks themselves, in some embodiments.

In each of FIGS. 10A and 10B, the hyperlinked annotations may direct (i.e., automatically navigate) the reader of the electronic report to a section of the report pertaining to the selected location. Thus, the electronic report may include a location selection section for each of A1 (1010), A2 (1012), and A3 (1011). The electronic report may be in any of a wide variety of formats, including, but not limited to, Word, XML, HTML, PowerPoint, PDF, a webpage, a proprietary electronic document, a web page, or any other suitable format.

Figure 11A:
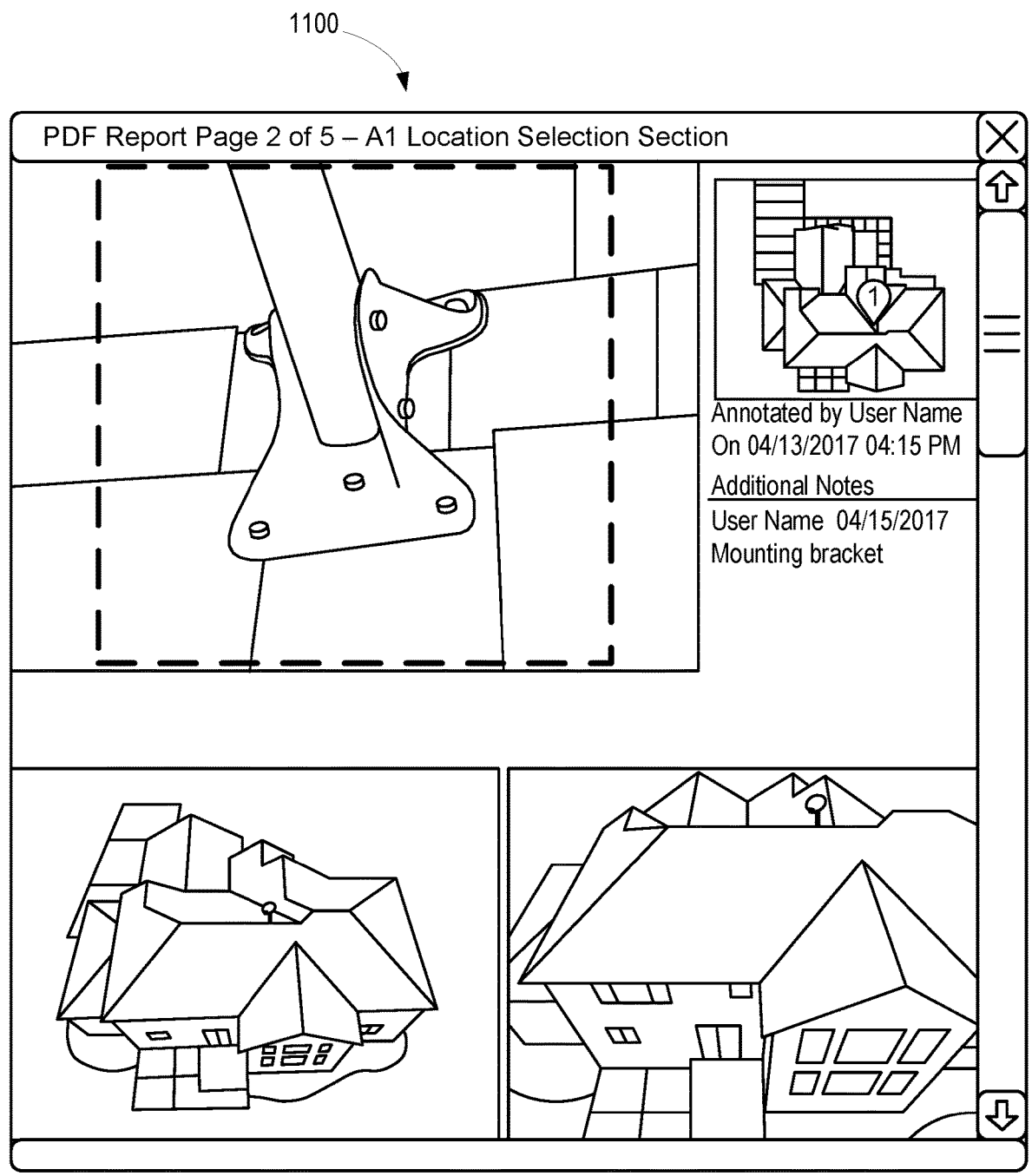
FIG. 11A illustrates a first location selection section of the hyperlinked A1 section with context-rich collection of images to illustrate the annotated element and a relative location of the annotated element, according to various embodiments.

FIG. 11A illustrates a first location selection section 1100 of the hyperlinked A1 section from FIGS. 10A and 10B. The illustrated location selection section 1100 includes context-rich collection of images to illustrate the annotated element (the mounting bracket) and a relative location of the annotated element using three different views of the element, according to various embodiments.

Figure 11B:
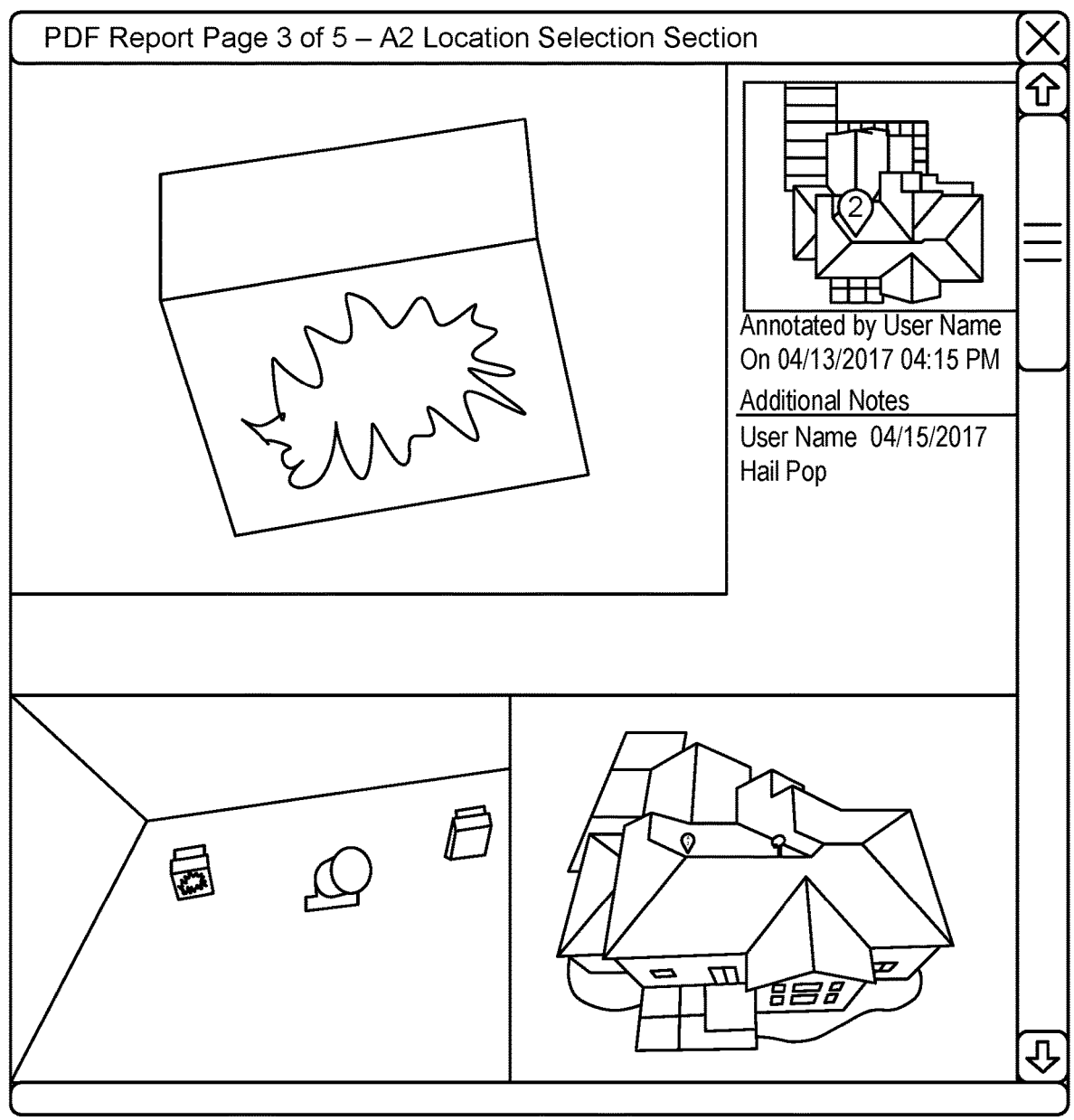
FIG. 11B illustrates a second location selection section of the hyperlinked A2 section with context-rich collection of images to illustrate the annotated element and a relative location of the annotated element, according to various embodiments.

FIG. 11B illustrates a second location selection section 1150 of the hyperlinked A2 section from FIGS. 10A and 10B. The illustrated location selection section 1150 includes context-rich collection of images to illustrate the annotated element (the hail pop) and a relative location of the annotated element using three different views of the element, according to various embodiments.

Figure 12:
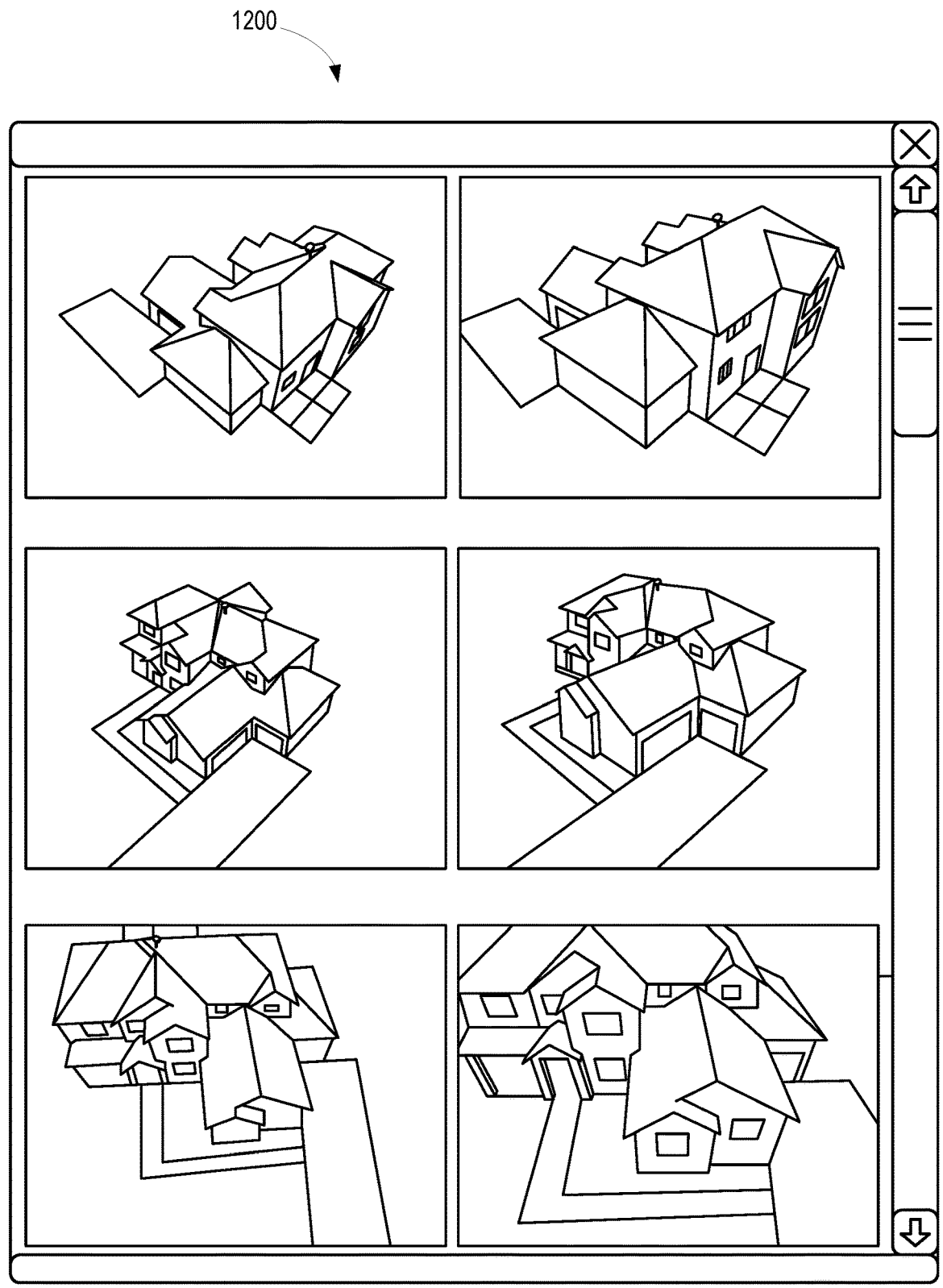
FIG. 12 illustrates additional views of the subject of the report, according to various embodiments.

FIG. 12 illustrates additional views 1200 of the subject of the report, according to various embodiments.

Figure 13:
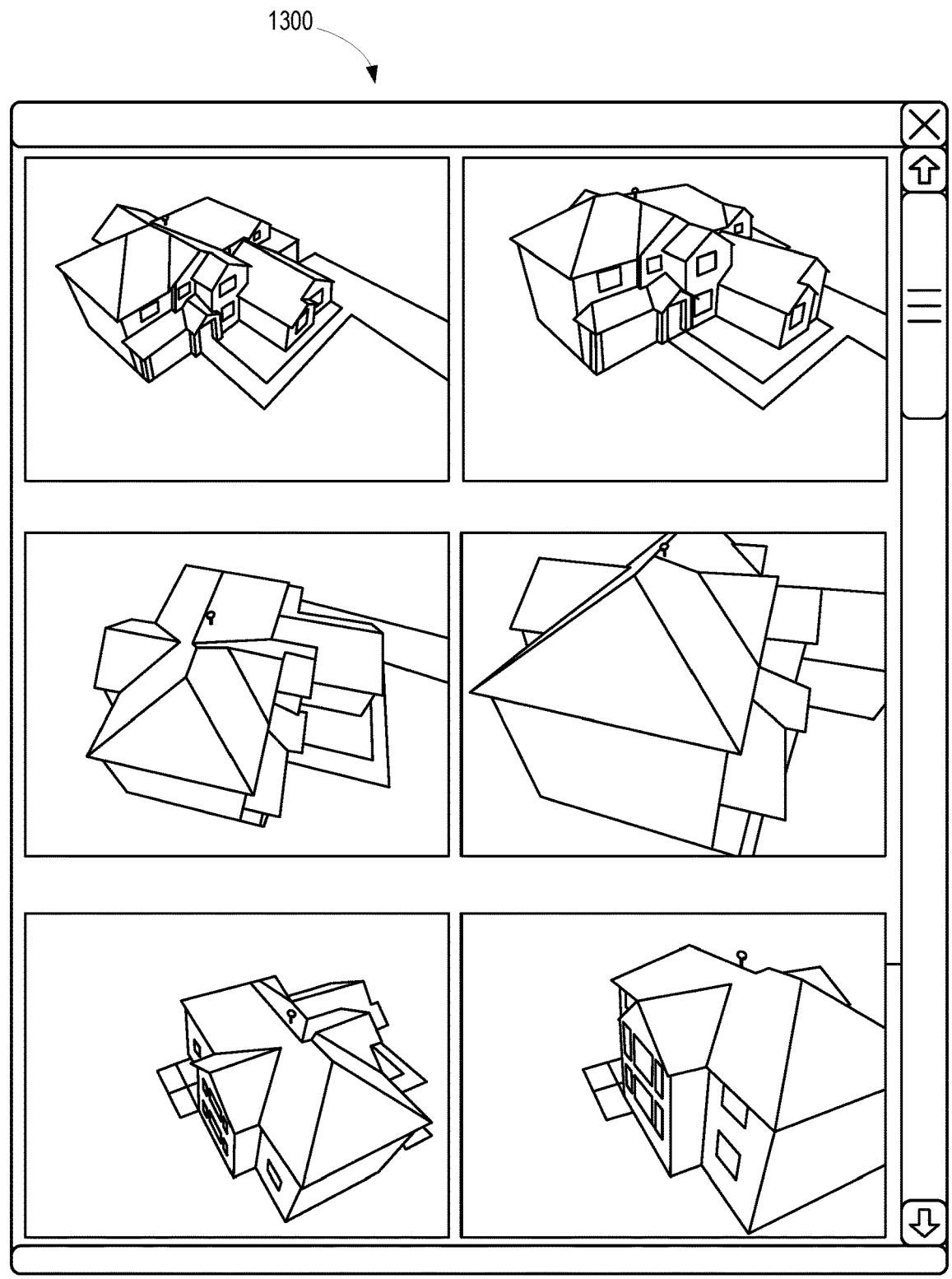
FIG. 13 illustrates additional views of the subject of the report, according to various embodiments.

FIG. 13 illustrates additional views 1300 of the subject of the report, according to various embodiments.

The additional images selected for inclusion in the report as shown in FIGS. 12 and 13 may include additional or alternative full-subject images, may include oblique images to provide additional context, may provide false color or exaggerated contrast images to provide additional context or information, and/or images captured using non-visible light sensors.

Moreover, the additional images selected for inclusion in the report may be based on an operator's manual selection. In other embodiments, the additional images and the number of additional images may be automatically selected by the system. In still other embodiments an operator may manually select the number of additional images to include in the report and the system may automatically select which of the available images to include.

According to various embodiments, the system may select the addition images for inclusion based on a function of at least one of (i) an amount of time a user has spent with the additionally selected microscan image in an active window, (ii) a location of an element associated one or more annotations that is also found in a frame of the additionally selected microscan image, (iii) the number of annotations related to the additionally selected image, and (iv) a distance to the element associated with the first annotation that is also found in the frame of the additionally selected microscan image.

This disclosure has been made with reference to various embodiments, including the best mode. However, those skilled in the art will recognize that changes and modifications may be made to the embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

What is claimed is:

1. A non-transitory computer-readable medium storing instructions that, when executed by a processor, are configured to cause the processor to perform operations for generating a graphical user interface (GUI), the operations comprising:
  importing a plurality of microscan images of a structure, wherein each of the plurality of microscan images is an image of a portion of the structure captured at a location defined relative to the structure;
  displaying, on an electronic display, a full-subject image of the structure as part of a GUI;
  receiving, via an electronic input device, a selection of a first location on the full-subject image of the structure;
  displaying, in response to the selection of the first location on the full-subject image, a portion of the GUI concurrently showing
    (i) the full-subject image of the structure,
    (ii) a marker on the full-subject image of the structure identifying the selected first location on the full-subject image of the structure, and
    (iii) at least two microscan images of the selected first location captured at different locations relative to the structure;
  receiving a selection of a first of the at least two microscan images of the structure at the selected first location;
  receiving a first annotation for the selected first microscan image of the structure at the selected first location;
  receiving a selection of a second of the at least two microscan images of the structure at the selected first location;

receiving a second annotation for the selected second microscan image of the structure at the selected first location;

receiving, via the electronic input device, a selection of a second location on the full-subject image;

displaying, in response to the selection of the second location on the full-subject image, the portion of the GUI updated to concurrently display:
(i) the full-subject image of the structure,
(ii) a marker on the full-subject image of the structure identifying the selected second location on the full-subject image of the structure, and
(iii) at least two microscan images of the structure at the selected second location;

receiving a selection of a first of the at least two microscan images of the structure at the selected second location;

receiving a third annotation for the selected first microscan image of the structure at the selected second location; and generating for display on an electronic display a report GUI that includes:
a full-subject image of the structure,
a first element on the full-subject image marking the selected first location, wherein the first element comprises a first hyperlink to a portion of the report GUI that includes the first and second annotations and the selected first and second microscan images of the structure at the selected first location, and
a second element on the full-subject image marking the selected second location, wherein the second element comprises a second hyperlink to a portion of the report GUI that includes the third annotation and the selected first microscan image of the structure at the selected second location.

2. The non-transitory computer-readable medium of claim 1, wherein at least some of the plurality of microscan images are false color images of data captured using an infrared sensing device.

3. The non-transitory computer-readable medium of claim 1, wherein at least one of the plurality of microscan images is represented by a value characterizing one of a moisture level and a slope of at least a portion of the structure.

4. The non-transitory computer-readable medium of claim 1, wherein the full-subject image of the structure includes the entire portion of the structure to which the report GUI pertains.

5. An annotation and report generation system for microscan data of a structure, comprising:
a computing device with at least one data port to receive a plurality of microscan images of a structure, wherein each of the plurality of microscan images is associated with a capture location defining a location at which each microscan image was captured relative to the structure;

an electronic display to display a first portion of a graphical user interface (GUI) with an electronic report including a first of the plurality of microscan images that includes a full-subject image of the structure;

an electronic input device to receive input from a user selecting a first location on the full-subject image of the structure;

a context-rich display layout module to display a second portion of the GUI including concurrent display of (i) the full-subject image of the structure, (ii) a marker on the full-subject image of the structure identifying the first location selection on the full-subject image of the structure, and (iii) at least two microscan images of the first location selection each taken at different capture locations;

a detailed image annotation display layout module to display a third portion of the GUI with a selected first of the at least two microscan images in an active detailed image panel and a plurality of the at least two microscan images in a gallery panel;

an annotation module to receive annotations associated with microscan images displayed within the active detailed image panel of the third portion of the GUI;

a report preparation module to create report images for inclusion in an electronic report for display in a fourth portion of the GUI, wherein the electronic report includes a full subject report image that includes the full-subject image of the structure and the marker on the full-subject image of the structure identifying the first location selection and a microscan report image of the first location selection that is associated with an annotation and displayed via the second portion of the GUI; and a report generation module to generate and display in a fifth portion of the GUI a multi-section electronic report that includes at least a full-subject section and a first location selection section,
wherein the full-subject section includes (i) the full subject report image of the structure, and (ii) a hyperlink to the first location selection section displayed via the second portion of the GUI, and
wherein the first location selection section includes at least the microscan report image.

6. The system of claim 5, wherein at least some of the plurality of microscan images are false-color images of data captured using an infrared sensing device.

7. The method of claim 5, wherein at least one of the plurality of microscan images is represented by a value characterizing one of a moisture level and a slope of at least a portion of the structure.

* * * * *